United States Patent
Peng et al.

(10) Patent No.: US 11,245,496 B2
(45) Date of Patent: Feb. 8, 2022

(54) METHOD AND APPARATUS FOR SENDING HARQ-ACK FEEDBACK CODEBOOK AND DEVICE

(71) Applicant: HUAWEI TECHNOLOGIES CO., LTD., Guangdong (CN)

(72) Inventors: Jinlin Peng, Shanghai (CN); Xinghua Song, Beijing (CN); Fan Wang, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 66 days.

(21) Appl. No.: 16/815,393

(22) Filed: Mar. 11, 2020

(65) Prior Publication Data
US 2020/0213044 A1      Jul. 2, 2020

Related U.S. Application Data

(63) Continuation of application No. PCT/CN2018/106230, filed on Sep. 18, 2018.

(30) Foreign Application Priority Data

Oct. 9, 2017 (CN) .......................... 201710930785.6

(51) Int. Cl.
*H04J 3/00* (2006.01)
*H04L 1/18* (2006.01)
(Continued)

(52) U.S. Cl.
CPC ......... *H04L 1/1819* (2013.01); *H04B 7/0456* (2013.01); *H04L 5/0055* (2013.01); *H04W 72/042* (2013.01)

(58) Field of Classification Search
None
See application file for complete search history.

(56) References Cited

U.S. PATENT DOCUMENTS

| 2011/0249656 A1 | 10/2011 | Cai et al. |
| 2017/0207895 A1 | 7/2017 | Yang et al. |
(Continued)

FOREIGN PATENT DOCUMENTS

| CN | 102148673 A | 8/2011 |
| CN | 104396174 A | 3/2015 |
(Continued)

OTHER PUBLICATIONS

Extended European Search Report issued in European Application No. 18865685.4 dated Aug. 4, 2020, 7 pages.
(Continued)

*Primary Examiner* — Kwang B Yao
*Assistant Examiner* — Juvena W Loo
(74) *Attorney, Agent, or Firm* — Fish & Richardson P.C.

(57) ABSTRACT

This application provides methods and apparatuses for sending a HARQ-ACK feedback codebook. One example method includes detecting DCI in a plurality of time units corresponding to at least one carrier, where a type of the DCI is a first DCI type or a second DCI type, where the first DCI is used to indicate to feed back CBG-level HARQ-ACK information for data scheduled by the first DCI, and where the second DCI is used to indicate to feed back TB-level HARQ-ACK information for data scheduled by the second DCI. A HARQ-ACK feedback codebook is then sent to a network device, where the codebook includes HARQ-ACK information of at least one piece of data scheduled by the DCI, and the HARQ-ACK feedback codebook is determined according to the type of the DCI and a type of the HARQ-ACK feedback codebook.

20 Claims, 12 Drawing Sheets

(51) Int. Cl.
  *H04B 7/0456* (2017.01)
  *H04L 5/00* (2006.01)
  *H04W 72/04* (2009.01)

(56) References Cited

U.S. PATENT DOCUMENTS

| | | | |
|---|---|---|---|
| 2018/0167931 A1* | 6/2018 | Papasakellariou | H04L 1/1887 |
| 2018/0287744 A1* | 10/2018 | Sundararajan | H04L 1/1819 |
| 2018/0287745 A1* | 10/2018 | Sun | H04L 1/1864 |
| 2018/0310257 A1* | 10/2018 | Papasakellariou | H04W 72/1289 |
| 2018/0367257 A1* | 12/2018 | Li | H04L 1/1845 |
| 2019/0037586 A1* | 1/2019 | Park | H04L 1/0031 |
| 2019/0045489 A1* | 2/2019 | He | H04W 72/12 |
| 2019/0074929 A1* | 3/2019 | Aiba | H04W 76/27 |
| 2019/0089494 A1* | 3/2019 | Park | H04L 1/1809 |
| 2019/0191487 A1* | 6/2019 | Kwon | H04L 1/1819 |
| 2019/0215128 A1* | 7/2019 | Zhang | H04L 5/001 |
| 2019/0363840 A1* | 11/2019 | Wang | H04L 1/1822 |
| 2019/0379487 A1* | 12/2019 | Hwang | H04L 1/00 |
| 2019/0379489 A1* | 12/2019 | Hwang | H04L 1/1819 |
| 2020/0059327 A1* | 2/2020 | Kini | H04W 72/042 |
| 2020/0084789 A1* | 3/2020 | Wang | H04L 5/0055 |
| 2020/0136750 A1* | 4/2020 | Baldemair | H04L 1/1812 |
| 2020/0154309 A1* | 5/2020 | Takeda | H04L 1/1614 |
| 2020/0169357 A1* | 5/2020 | Lei | H04B 7/0639 |
| 2020/0221455 A1* | 7/2020 | Lei | H04L 1/1864 |
| 2020/0328848 A1* | 10/2020 | He | H04L 1/1854 |
| 2021/0120537 A1* | 4/2021 | Lei | H04L 5/0053 |
| 2021/0135791 A1* | 5/2021 | Wang | H04L 1/0009 |
| 2021/0152292 A1* | 5/2021 | Fu | H04W 52/48 |

FOREIGN PATENT DOCUMENTS

| | | |
|---|---|---|
| CN | 106301702 A | 1/2017 |
| CN | 106888074 A | 6/2017 |
| CN | 106953718 A | 7/2017 |

OTHER PUBLICATIONS

NTT Docomo et al., "DL control signalling for CBG-based (re)transmission," 3GPP TSG RAN WG1 NR Ad-Hoc#2, R1-171 1113, Qingdao, China, 37-30 Jun. 2017, 5 pages.

NTT Docomo et al., "HARQ-ACK multiplexing," 3GPP TSG RAN WG1 Nr Ad-Hoc #2, R1-1711116, Qingdao, PR China, Jun. 27-30, 2017, 3 pages.

PCT International Search Report and Written Opinion issued in International Application No. PCT/CN2018/106230 dated Nov. 30, 2018, 16 pages (with English translation).

Office Action issued in Chinese Application No. 201710930785.6 dated Feb. 24, 2021, 8 pages.

Office Action in Indian Application No. 202037007595, dated May 21, 2021, 7 pages.

* cited by examiner

| NACK | NACK | TB 2-CBG 1 | TB 2-CBG 2 | TB 3-ACK | NACK | TB 4-CBG 1 | TB 4-CBG 2 |

FIG. 9A

| NACK | NACK | TB 2-CBG 1 | TB 2-CBG 2 | TB 3-ACK | TB 3-ACK | TB 4-CBG 1 | TB 4-CBG 2 |

FIG. 9B

| NACK | NACK | TB 2-ACK | NACK | TB 3-CBG 1 | TB 3-CBG 2 | TB 4-ACK | NACK |

FIG. 11

| NACK | NACK | TB 2-CBG 1 | TB 2-CBG 2 | TB 4-CBG 1 | TB 4-CBG 2 | TB 3-ACK | TB 5-ACK |

FIG. 13

| NACK | NACK | TB 2-CBG 1 | TB 2-CBG 2 | NACK | NACK | TB 4-CBG 1 | TB 4-CBG 2 |

FIG. 14A

METHOD AND APPARATUS FOR SENDING HARQ-ACK FEEDBACK CODEBOOK AND DEVICE

CROSS-REFERENCE TO RELATED APPLICATIONS

This application is a continuation of International Application No. PCT/CN2018/106230, filed on Sep. 18, 2018, which claims priority to Chinese Patent Application No. 201710930785.6, filed on Oct. 9, 2017. The disclosures of the aforementioned applications are hereby incorporated by reference in their entireties.

TECHNICAL FIELD

This application relates to the field of communication technologies, and in particular, to a method and an apparatus for sending a HARQ-ACK feedback codebook and a device.

BACKGROUND

In a long term evolution (LTE) system, downlink physical layer data is carried on a physical downlink shared channel (PDSCH). To ensure reliability and transmission efficiency of physical layer data transmission, a hybrid automatic repeat request (HARQ) is used in LTE. To be specific, sent data may be correspondingly a transport block (TB) at a physical layer, a network device adds a cyclic redundancy check (CRC) to the TB, and the CRC is used by a terminal to check whether the TB is successfully received. Further, the network device may divide the TB into several code blocks (CB). The network device may add a corresponding CRC to each CB to check whether the CB is successfully received. After receiving the data, the terminal attempts to decode the received data. If CRC checks of all the CBs succeed and a CRC check of the TB succeeds, the terminal feeds back a one-bit TB-level acknowledgement (ACK) to the network device, to indicate that the data is successfully received. If a CRC check of a CB fails or a CRC check of the TB fails, the terminal feeds back a one-bit TB-level negative acknowledgement (NACK) to the network device, to indicate that the data fails to be received. In this case, the network device needs to retransmit the entire TB. The ACK or the NACK is referred to as HARQ-ACK information.

In the prior art, the terminal is supported to transmit, in one piece of uplink HARQ-ACK information (Uplink Control Information, UCI), decoding results of a plurality of TBs transmitted by the network device. The plurality of TBs may be from different downlink time units and/or different codewords in multiple-input multiple-output (MIMO) and/or different carriers in carrier aggregation. Such a manner is referred to as HARQ-ACK multiplexing. The UCI includes a HARQ-ACK feedback codebook, and a size of the HARQ-ACK feedback codebook is a quantity of bits of HARQ-ACK information included in the codebook. That each bit in the HARQ-ACK feedback codebook corresponds to a specific TB is a codebook index manner.

In a scenario in which only one or several CBs fail to be received, an entire TB still needs to be retransmitted, causing relatively low communication efficiency. Therefore, with development of communications technologies, code block group (CBG)-level transmission and CBG-level feedback may be configured through signaling. Specifically, CBs obtained after a TB is divided are grouped into at least one CBG. Each CBG includes at least one CB, and a one-bit HARQ-ACK is fed back for each CBG. To be specific, when CRC checks of all CBs included in a CBG succeed or all the CBs are correctly decoded, a one-bit ACK is fed back for the CBG; otherwise, a one-bit NACK is fed back for the CBG. In this way, after receiving HARQ-ACK information of each CBG, the network device needs to retransmit only a CBG for which the NACK is fed back, thereby improving retransmission efficiency. However, compared with one-bit TB-level feedback, overheads of the CBG-level feedback are increased. To flexibly control feedback overheads and ensure uplink coverage performance, after configuring CBG transmission and feedback for the terminal device through radio resource control (RRC) signaling, the network device can still indicate, through downlink control signaling (DCI), the terminal to flexibly back off to TB-level transmission and TB-level feedback.

However, DCI based on TB-level transmission and TB-level feedback is currently performed for one TB or two codewords in MIMO. How to transmit a HARQ-ACK feedback codebook in a HARQ-ACK multiplexing scenario is a technical problem to be urgently resolved in this application.

SUMMARY

This application provides a method and an apparatus for sending a HARQ-ACK feedback codebook and a device. To be specific, this application provides a solution to transmitting a HARQ-ACK feedback codebook in a HARQ-ACK multiplexing scenario.

According to a first aspect, this application provides a method for sending a HARQ-ACK feedback codebook, including: detecting, by a terminal, downlink control information DCI in a plurality of time units corresponding to at least one carrier, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second DCI is used to indicate to feed back transport block TB-level HARQ-ACK information for data scheduled by using the second DCI; and sending, by the terminal, a HARQ-ACK feedback codebook to a network device, where the HARQ-ACK feedback codebook includes HARQ-ACK information of at least one piece of data scheduled by using the DCI, where the HARQ-ACK feedback codebook is determined according to the type of the DCI and a type of the HARQ-ACK feedback codebook, and the type of the HARQ-ACK feedback codebook is a semi-persistent type or a dynamic type.

This application has the following beneficial effect: The method can be used to resolve a technical problem of how to transmit a HARQ-ACK feedback codebook in a HARQ-ACK multiplexing scenario.

Optionally, if first data is scheduled according to the first DCI, the first M1 bits in N1 bits that are in the HARQ-ACK feedback codebook and that correspond to the first data are code block group CBG-level HARQ-ACK information of the first data, and the following (N1−M1) bits in the N1 bits are negative acknowledgments NACKs, where N1 is a maximum quantity of CBGs configured by the network device for the first data, and M1 is a quantity of CBGs actually included in the first data. If second data is scheduled according to the second DCI, the first bit in N2 bits in the HARQ-ACK feedback codebook that correspond to the second data is TB-level HARQ-ACK information of the second data, and each of the following (N2−1) bits in the N2 bits is a NACK or TB-level HARQ-ACK information, where N2 is a maximum quantity of CBGs configured by the network device for the second data. The first data is any data that is in the at least one piece of data and that is scheduled according to the first DCI, and the second data is any data that is in the at least one piece of data and that is scheduled according to the second DCI.

This application has the following beneficial effects: When the second data is scheduled according to the second DCI, the first bit in the N2 bits in the HARQ-ACK feedback codebook that correspond to the second data is the TB-level HARQ-ACK information, that is, a total codebook size remains unchanged. This helps the network device decode UCI, thereby improving coverage/decoding performance of uplink UCI. In addition, the total codebook size remains unchanged, and a location of HARQ-ACK information corresponding to each TB is also determined. Therefore, even if DCI is lost, a location and an arrangement of HARQ-ACK information of other data are not affected, so as to ensure that the HARQ-ACK information of the other data can be correctly received, thereby improving system robustness.

Optionally, all HARQ-ACK information included in the HARQ-ACK feedback codebook is CBG-level HARQ-ACK information.

This application has the following beneficial effects: A total codebook size remains unchanged, so as to help the network device decode UCI, thereby improving coverage/decoding performance of uplink UCI. In addition, the total codebook size remains unchanged, and a location of HARQ-ACK information corresponding to each TB is also determined. Therefore, even if DCI is lost, a location and an arrangement of HARQ-ACK information of other data are not affected, so as to ensure that the HARQ-ACK information of the other data can be correctly received, thereby improving system robustness.

Optionally, the method further includes: determining, by the terminal, a size of the HARQ-ACK feedback codebook. If the determined size of the HARQ-ACK feedback codebook is less than a preset threshold, the first bit in N2 bits in the HARQ-ACK feedback codebook that correspond to second data is TB-level HARQ-ACK information of the second data, and each of the following (N2−1) bits in the N2 bits is a NACK or TB-level HARQ-ACK information; or if the determined size of the HARQ-ACK feedback codebook is greater than or equal to a preset threshold, the first M2 bits in N2 bits that are in the HARQ-ACK feedback codebook and that correspond to second data are CBG-level HARQ-ACK information of the second data, and the following (N2−M2) bits in the N2 bits are negative acknowledgments NACKs, where N2 is a maximum quantity of CBGs configured by the network device for the second data, and M2 is a quantity of CBGs actually included in the second data. The second data is any data that is in the at least one piece of data and that is scheduled according to the second DCI.

This application has the following beneficial effects: A total codebook size remains unchanged, so as to help the network device decode UCI, thereby improving coverage/decoding performance of uplink UCI. In addition, the total codebook size remains unchanged, and a location of HARQ-ACK information corresponding to each TB is also determined. Therefore, even if DCI is lost, a location and an arrangement of HARQ-ACK information of other data are not affected, so as to ensure that the HARQ-ACK information of the other data can be correctly received, thereby improving system robustness.

Optionally, if the type of the HARQ-ACK feedback codebook is the dynamic type, the HARQ-ACK feedback codebook includes a first sub-codebook and/or a second sub-codebook. The first sub-codebook includes CBG-level HARQ-ACK information of data scheduled according to the first DCI, and the second sub-codebook includes TB-level HARQ-ACK information of data scheduled according to the second DCI.

Optionally, the first M1 bits in N1 bits that are in the first sub-codebook and that correspond to first data are CBG-level HARQ-ACK information of the first data, and the following (N1−M1) bits in the N1 bits are NACKs, where N1 is a maximum quantity of CBGs configured by the network device for the first data, and M1 is a quantity of CBGs actually included in the first data; and one bit, in the second sub-codebook, corresponding to second data is TB-level HARQ-ACK information of the second data. The first data is any data that is in the at least one piece of data and that is scheduled according to the first DCI, and the second data is any data that is in the at least one piece of data and that is scheduled according to the second DCI.

This application has the following beneficial effects: According to the foregoing arrangement of the first sub-codebook and the second sub-codebook, HARQ-ACK information corresponding to each piece of second data occupies one bit instead of N bits in the second sub-codebook, thereby reducing overheads of the HARQ-ACK feedback codebook. In addition, a DAI of the first DCI and a DAI of the second DCI are counted separately to respectively generate the first sub-codebook and the second sub-codebook. The first sub-codebook and the second sub-codebook are arranged separately. Therefore, when DCI is lost, because a quantity of bits occupied by the first sub-codebook remains unchanged, and a location of HARQ-ACK information corresponding to each TB is also determined, even if the DCI is lost, a location and an arrangement of HARQ-ACK information of other data are not affected, so as to ensure that the HARQ-ACK information of the other data can be correctly received, thereby improving system robustness. Further, a location of HARQ-ACK information corresponding to each TB is also determined in the second sub-codebook. Therefore, even if DCI is lost, a location and an arrangement of HARQ-ACK information of other data are not affected, so as to ensure that the HARQ-ACK information of the other data can be correctly received, thereby improving system robustness.

Optionally, a size of the first sub-codebook is determined according to at least a downlink assignment index DAI value in the first DCI and N1; and a size of the second sub-codebook is determined according to at least a DAI value in the second DCI.

This application has the following beneficial effect: The method can be used to effectively determine the size of the first sub-codebook and the size of the second sub-codebook.

Optionally, if the type of the HARQ-ACK feedback codebook is the semi-persistent type, the size of the HARQ-ACK feedback codebook is determined according to at least a quantity of the at least one carrier, a quantity of the plurality of time units, and a maximum quantity of CBGs configured by the network device for each carrier.

This application has the following beneficial effect: The method can be used to effectively determine the size of the HARQ-ACK feedback codebook.

Optionally, if the type of the HARQ-ACK feedback codebook is the dynamic type, the size of the HARQ-ACK feedback codebook is determined according to at least a downlink assignment index DAI value in the DCI and a maximum quantity of CBGs configured by the network device for each carrier.

This application has the following beneficial effect: The method can be used to effectively determine the size of the HARQ-ACK feedback codebook.

A method for sending a HARQ-ACK feedback codebook is described below from a network device side. An implementation principle and technical effects thereof are similar to the principle and the technical effects of the foregoing method, and details are not described herein again.

According to a second aspect, this application provides a method for sending a HARQ-ACK feedback codebook, including: sending, by a network device, downlink control information DCI in a plurality of time units corresponding to at least one carrier to a terminal, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second DCI is used to indicate to feed back transport block TB-level HARQ-ACK information for data scheduled by using the second DCI; and receiving, by the network device, a HARQ-ACK feedback codebook sent by the terminal, where the HARQ-ACK feedback codebook includes HARQ-ACK information of at least one piece of data scheduled by using the DCI, where the HARQ-ACK feedback codebook is determined according to the type of the DCI and a type of the HARQ-ACK feedback codebook, and the type of the HARQ-ACK feedback codebook is a semi-persistent type or a dynamic type.

Optionally, if first data is scheduled according to the first DCI, the first M1 bits in N1 bits that are in the HARQ-ACK feedback codebook and that correspond to the first data are code block group CBG-level HARQ-ACK information of the first data, and the following (N1−M1) bits in the N1 bits are negative acknowledgments NACKs, where N1 is a maximum quantity of CBGs configured by the network device for the first data, and M1 is a quantity of CBGs actually included in the first data. If second data is scheduled according to the second DCI, the first bit in N2 bits in the HARQ-ACK feedback codebook that correspond to the second data is TB-level HARQ-ACK information of the second data, and each of the following (N2−1) bits in the N2 bits is a NACK or TB-level HARQ-ACK information, where N2 is a maximum quantity of CBGs configured by the network device for the second data. The first data is any data that is in the at least one piece of data and that is scheduled according to the first DCI, and the second data is any data that is in the at least one piece of data and that is scheduled according to the second DCI.

Optionally, all HARQ-ACK information included in the HARQ-ACK feedback codebook is CBG-level HARQ-ACK information.

Optionally, if the type of the HARQ-ACK feedback codebook is the dynamic type, the HARQ-ACK feedback codebook includes a first sub-codebook and/or a second sub-codebook. The first sub-codebook includes CBG-level HARQ-ACK information of data scheduled according to the first DCI, and the second sub-codebook includes TB-level HARQ-ACK information of data scheduled according to the second DCI.

Optionally, the first M1 bits in N1 bits that are in the first sub-codebook and that correspond to first data are CBG-level HARQ-ACK information of the first data, and the following (N1−M1) bits in the N1 bits are NACKs, where N1 is a maximum quantity of CBGs configured by the network device for the first data, and M1 is a quantity of CBGs actually included in the first data; and one bit, in the second sub-codebook, corresponding to second data is TB-level HARQ-ACK information of the second data. The first data is any data that is in the at least one piece of data and that is scheduled according to the first DCI, and the second data is any data that is in the at least one piece of data and that is scheduled according to the second DCI.

Optionally, a size of the first sub-codebook is determined according to at least a downlink assignment index DAI value in the first DCI and N1; and a size of the second sub-codebook is determined according to at least a DAI value in the second DCI.

Optionally, if the type of the HARQ-ACK feedback codebook is the semi-persistent type, the size of the HARQ-ACK feedback codebook is determined according to at least a quantity of the at least one carrier, a quantity of the plurality of time units, and a maximum quantity of CBGs configured by the network device for each carrier.

Optionally, if the type of the HARQ-ACK feedback codebook is the dynamic type, the size of the HARQ-ACK feedback codebook is determined according to at least a downlink assignment index DAI value in the DCI and a maximum quantity of CBGs configured by the network device for each carrier.

An apparatus for sending a HARQ-ACK feedback codebook and a terminal are described below. An implementation principle and technical effects thereof are similar to the principle and the technical effects of the method related to the terminal, and details are not described herein again.

According to a third aspect, this application provides an apparatus for sending a HARQ-ACK feedback codebook, including: a detection module, configured to detect downlink control information DCI in a plurality of time units corresponding to at least one carrier, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second DCI is used to indicate to feed back transport block TB-level HARQ-ACK information for data scheduled by using the second DCI; and a sending module, configured to send a HARQ-ACK feedback codebook to a network device, where the HARQ-ACK feedback codebook includes HARQ-ACK information of at least one piece of data scheduled by using the DCI. The HARQ-ACK feedback codebook is determined according to the type of the DCI and a type of the HARQ-ACK feedback codebook, and the type of the HARQ-ACK feedback codebook is a semi-persistent type or a dynamic type.

According to a fourth aspect, this application provides a terminal, including: a processor, configured to detect downlink control information DCI in a plurality of time units corresponding to at least one carrier, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second. DCI is used to indicate to feed back transport block TB-level HARQ-ACK information for data scheduled by using the second DCI; and a transmitter, configured to send a HARQ-ACK feedback codebook to a network device, where the HARQ-ACK feedback codebook includes HARQ-ACK information of at least one piece of data scheduled by using the DCI. The HARQ-ACK feedback codebook is determined according to the type of the DCI and a type of the HARQ-ACK feedback codebook, and the type of the HARQ-ACK feedback codebook is a semi-persistent type or a dynamic type.

An apparatus for sending a HARQ-ACK feedback codebook and a network device are described below. An implementation principle and technical effects thereof are similar to the principle and the technical effects of the method related to the network device, and details are not described herein again.

According to a fifth aspect, this application provides an apparatus for sending a HARQ-ACK feedback codebook, including: a sending module, configured to send downlink control information DCI in a plurality of time units corresponding to at least one carrier to a terminal, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second DCI is used to indicate to feed back transport block TB-level HARQ-ACK information for data scheduled by using the second DCI, and a receiving module, configured to receive a HARQ-ACK feedback codebook sent by the terminal, where the HARQ-ACK feedback codebook includes HARQ-ACK information of at least one piece of data scheduled by using the DCI. The HARQ-ACK feedback codebook is determined according to the type of the DCI and a type of the HARQ-ACK feedback codebook, and the type of the HARQ-ACK feedback codebook is a semi-persistent type or a dynamic type.

According to a sixth aspect, this application provides a network device, including: a transmitter, configured to send downlink control information DCI in a plurality of time units corresponding to at least one carrier to a terminal, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second DCI is used to indicate to feed back transport block TB-level HARQ-ACK information for data scheduled by using the second DCI; and a receiver, configured to receive a HARQ-ACK feedback codebook sent by the terminal, where the HARQ-ACK feedback codebook includes HARQ-ACK information of at least one piece of data scheduled by using the DCI. The HARQ-ACK feedback codebook is determined according to the type of the DCI and a type of the HARQ-ACK feedback codebook, and the type of the HARQ-ACK feedback codebook is a semi-persistent type or a dynamic type.

According to a seventh aspect, this application provides a computer storage medium, configured to store a computer software instruction that is used by the apparatus in the third aspect or the terminal in the fourth aspect. The computer software instruction includes a program designed to perform the third aspect or the fourth aspect.

According to an eighth aspect, this application provides a computer program product including an instruction. When the computer program is executed by a computer, the instruction enables the computer to execute functions executed by the apparatus in the third aspect or the terminal in the fourth aspect.

According to a ninth aspect, this application provides a computer storage medium, configured to store a computer software instruction that is used by the apparatus in the fifth aspect or the network device in the sixth aspect. The computer software instruction includes a program designed to perform the fifth aspect or the sixth aspect.

According to a tenth aspect, this application provides a computer program product including an instruction. When the computer program is executed by a computer, the instruction enables the computer to execute functions executed by the apparatus in the fifth aspect or the network device in the sixth aspect.

According to an eleventh aspect, this application provides an apparatus. The apparatus includes modules or units configured to perform the method according to any one of the first aspect or the possible implementations of the first aspect. It should be understood that the apparatus is a chip, or the apparatus includes at least one processor and one transceiver.

According to a twelfth aspect, this application provides a terminal. The terminal is at least one processing element (or a chip) configured to perform the method according to any one of the first aspect or the possible implementations of the first aspect.

According to a thirteenth aspect, this application provides an apparatus. The apparatus includes modules or units configured to perform the method according to any one of the second aspect or the possible implementations of the second aspect. It should be understood that the apparatus is a chip, or the apparatus includes at least one processor and one transceiver.

According to a fourteenth aspect, this application provides a network device. The network device is at least one processing element (or a chip) configured to perform the method according to any one of the second aspect or the possible implementations of the second aspect.

This application provides the method and the apparatus for sending a HARQ-ACK feedback codebook and the device. The method includes: detecting, by the terminal, the downlink control information DCI in the plurality of time units corresponding to the at least one carrier, where the type of the DCI is the first DCI type or the second. DCI type, the first DCI is used to indicate to feed back the code block group CBG-level hybrid automatic repeat request-acknowledgment HARQ-ACK information for the data scheduled by using the first DCI, and the second DCI is used to indicate to feed back the transport block TB-level HARQ-ACK information for the data scheduled by using the second DCI; and sending, by the terminal, the HARQ-ACK feedback codebook to the network device, where the HARQ-ACK feedback codebook includes the HARQ-ACK information of the at least one piece of data scheduled by using the DCI, where the HARQ-ACK feedback codebook is determined according to the type of the DCI and the type of the HARQ-ACK feedback codebook, and the type of the HARQ-ACK feedback codebook is a semi-persistent type or a dynamic type. The method can be used to resolve the technical problem of how to transmit a HARQ-ACK feedback codebook in the HARQ-ACK multiplexing scenario.

BRIEF DESCRIPTION OF DRAWINGS

FIG. 9A is a schematic diagram of a HARQ-ACK feedback codebook according to an embodiment of this application;

FIG. 9B is a schematic diagram of a HARQ-ACK feedback codebook according to another embodiment of this application;

FIG. 11 is a schematic diagram of a HARQ-ACK feedback codebook according to an embodiment of this application;

FIG. 13 is a schematic diagram of a HARQ-ACK feedback codebook according to an embodiment of this application;

FIG. 14A is a schematic diagram of a HARQ-ACK feedback codebook according to an embodiment of this application;

DESCRIPTION OF EMBODIMENTS

Before this application is described, related knowledge in this application is described below.

HARQ feedback codebook (also referred to as a HARQ-ACK feedback codebook): A terminal may feed back, in one piece of UCI to a network device, decoding results of a plurality of pieces of data transmitted by the network device. The plurality of pieces of data may be from different downlink time units and/or different codewords in MIMO and/or different carriers in carrier aggregation. The decoding results included in the UCI are a HARQ feedback codebook. For example, that the plurality of pieces of data may be from different downlink time units and/or different codewords in MIMO means that the plurality of pieces of data may be data in different downlink time units or may be different codewords in MIMO, or means that a part of the data is data in different downlink unit times, and the other part of the data is different codewords in MIMO.

In this application, data may be understood as a TB, a code block group (CBG), or other data. This is not limited in this application.

In this application, a time unit may be a subframe or a transmission time interval (one transmission time interval is equal to a sum of lengths of several subframes, or a sum of several transmission time intervals is equal to a length of one subframe); or may be one time-domain symbol, a plurality of time-domain symbols, one slot, a plurality of slots, one mini-slot, a plurality of mini-slots, a combination of a mini-slot and a slot, a combination of a symbol and a slot, a combination of a mini-slot and a slot, or the like. Quantities of symbols/lengths of time units are unnecessarily the same. If a time unit carries a PDSCH, a PDCCH, UCI, or the like, the PDSCH, the PDCCH, or the UCI may not need to occupy all time-domain symbols and/or frequency-domain resources of the time unit.

Figure 1:
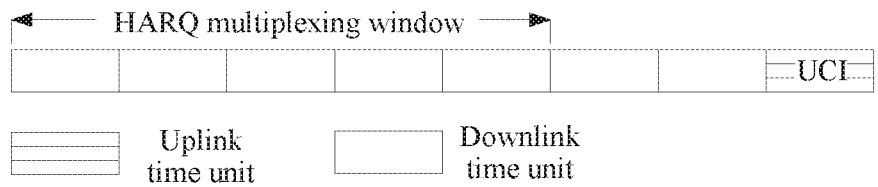
FIG. 1 is a schematic diagram of a HARQ multiplexing window according to an embodiment of this application.

In this application, a physical downlink control channel (PDCCH) (used to transmit DCI) and a PDSCH are carried in a downlink time unit (or a downlink transmission opportunity mixing uplink and downlink time units), and UCI is carried in an uplink time unit (or an uplink transmission opportunity mixing uplink and downlink time units). One piece of UCI, one uplink time unit, or one uplink transmission opportunity mixing uplink and downlink time units may need to feed back HARQ-ACK information of data transmitted in one or more downlink time units, and a set of fed back downlink time units is referred to as the HARQ multiplexing window. The HARQ multiplexing window may also be referred to as a time window, a bundling window, an associated set, or the like. Specifically, FIG. 1 is a schematic diagram of a HARQ multiplexing window according to an embodiment of this application. As shown in FIG. 1, a HARQ multiplexing window corresponding to a target uplink time unit (an uplink time unit carrying UCI) includes five time units. In other words, HARQ-ACK information of data transmitted in the five time units may be transmitted in the target uplink time units or carried in the UCI. In conclusion, it may be learned that HARQ-ACK information transmitted in one or more downlink time units may need to be fed back in each uplink time unit. The time window in this application may have the following two definitions.

1. The time window is a set of downlink time units carrying PDSCHs, and decoding results HARQ-ACKs of the PDSCHs may be carried in one piece of UCI. In this case, determining of the time window may be related to K1. For example, for target UCI in a time unit n, a possible earliest or forefront time unit in a time window corresponding to the time unit n is (n−"maximum value of K1"), and a possible latest or last time unit in the time window corresponding to the time unit n is (n−"minimum value of K1"). For example, for an uplink time unit n, if the minimum value of K1 is 2 and the maximum value of K1 is 6, an earliest time unit is n−6 in a time window corresponding to the uplink time unit n, and the last time unit in the time window may be n−2. K1 is a time relationship between a time unit for transmitting a PDSCH and a time unit for transmitting a PUCCH or a physical uplink shared channel (PUSCH), and the PDCCH or the PUSCH is used to transmit HARQ-ACK information/UCI of the data. Specifically, if downlink data is sent through the PDSCH in the $n^{th}$ time unit, a time unit correspondingly used for transmitting acknowledgement information through the physical uplink shared channel PUSCH or the PDCCH is the $(n+K1)^{th}$ time unit.

2. The time window is a set of downlink time units carrying PDCCHs, and decoding results HARQ-ACKs of PDSCHs scheduled through the PDCCHs may be carried in one piece of target uplink UCI. In this case, determining of the time window may be related to K1 and K0. For example, for target UCI in a time unit n, a possible earliest or forefront time unit in a time window corresponding to the time unit n is n−"maximum value of K1"−"maximum value of K0", and a possible latest or last time unit in the time window corresponding to the time unit n is n−"minimum value of K1"−"minimum value of K0". For example, for an uplink time unit n, if the minimum value of K1 is 2, the maximum value of K1 is 6, the minimum value of K0 is 0, and the maximum value of K0 is 4, an earliest time unit is n−6−4 in a time window corresponding to the uplink time unit n, and the last time unit in the time window may be n−2. K0 may be a time relationship between a time unit for transmitting a PDCCH and a time unit for transmitting a physical downlink shared channel PDSCH. Specifically, if scheduling information is sent through the PDCCH in the $n^{th}$ time unit, a time unit correspondingly used by the PDSCH is the $(n+K0)^{th}$ time unit.

A time window in LTE is fixed, that is, is determined based on a TDD uplink-downlink time unit configuration. A time window in an NR system may be dynamic and configurable. Specifically, a set of possible values of K1 and/or K0 are semi-persistently configured through RRC signaling, and then specific value information of K1 and/or K0 is notified through DCI signaling. A manner of configuring/determining a time window is not limited in this application.

HARQ-ACK multiplexing: A terminal transmits, in one piece of UCI, decoding results of a plurality of TBs transmitted by a network device. The plurality of TBs may be from different downlink time units and/or different codewords in MIMO and/or different carriers in carrier aggregation. Such a manner is referred to as HARQ-ACK multiplexing. A codebook generation manner in HARQ-ACK multiplexing may be a semi-persistent codebook or a dynamic codebook.

A size of a semi-persistent HARQ-ACK feedback codebook is determined by three dimensions: 1. a quantity of carriers, where the quantity of carriers may be configured by the network device by using information (for example, the information is one or a combination of RRC, a media access control control element (MAC CE), and a system information block (SIB), and this is not limited in this application); 2. a quantity of time units, in a time-domain set (that is, the HARQ multiplexing window), that needs to be fed back on each carrier, where in LTE, the time-domain set depends on a downlink (DL)/uplink (UL) configuration (in an NR, a determining manner may be adjusted, for example, the time-domain set is determined based on a size of a time-domain set that is of HARQ feedback and that is configured through RRC, or is determined based on a possible value set of a feedback time sequence configured through RRC, and this is not limited in this application); and 3. a quantity of codewords, where if at least one two-codeword transmission exists in a HARQ multiplexing window on a carrier and no hybrid automatic repeat request-acknowledgement bundling (HARQ-ACK bundling) manner is used, a quantity of feedback bits corresponding to the carrier in the semi-persistent codebook is obtained by multiplying a size of the HARQ multiplexing window on the carrier by 2, where "/" means "or".

Figure 2:
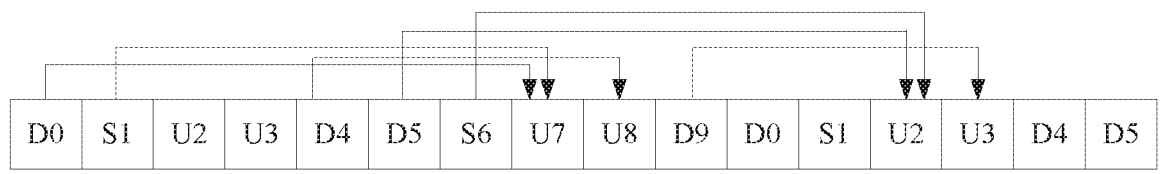
FIG. 2 is a schematic diagram of a TDD configuration according to an embodiment of this application.

Specifically, the network device may configure L carriers for the terminal to transmit data, and numbers of the L carriers are from 0 to L−1. In an implementation, the semi-persistent codebook is a result obtained after HARQ-ACK information of data on the L carriers is sequentially arranged. That C=5 is used as an example for description. A carrier 0 is a primary carrier (Primary Cell, Pcell), and the other four carriers are secondary carriers (Secondary Cell, Scell). A HARQ-ACK feedback codebook that needs to be sent on the Pcell is determined, a HARQ-ACK feedback codebook that needs to be sent on the Scell is determined, and the HARQ-ACK feedback codebooks that need to be sent on the Pcell and the Scell are cascaded to form a final HARQ-ACK feedback codebook. FIG. 2 is a schematic diagram of a TDD configuration according to an embodiment of this application. As shown in FIG. 2, the five carriers all are carriers of a TDD configuration 1 in LTE. In a time unit 7, HARQ feedback needs to be performed for a time unit 0 and a time unit 1. The terminal correctly receives data in only the time unit 0 on the Pcell, and does not correctly receive data on the secondary carrier or there is no data transmission on the secondary carrier. In this case, the HARQ-ACK feedback codebook is 1000000000 (the first two bits 10 are HARQ-ACK information on the Pcell, and the following eight bits correspond to HARQ-ACK information on the four Scells).

In addition, when the network device configures CBG-level transmission and CBG feedback for the terminal device on a carrier through RRC signaling, and configures a maximum quantity of CBGs as N, a quantity of bits of HARQ-ACK information of the carrier in the semi-persistent codebook needs to be obtained by multiplying the size obtained above by N. The first M bits in N bits at a location corresponding to each TB correspond to HARQ-ACK information of each CBG of the TB, and the following (N−M) bits may be NACKs by default.

Optionally, the maximum quantity N of CBGs is configured in the following manners. In a first manner, the configured maximum quantity N of CBGs may be a value configured by the network device for all carriers, that is, the network device requires only one piece of signaling to configure the parameter N. In a second manner, the network device configures a value for each carrier (for example, a maximum quantity of CBGs configured for the $c^{th}$ carrier is Nc, that is, the network device requires C pieces of signaling to configure C parameters). When there are two codewords, the two codewords of the $c^{th}$ carrier correspond to same Nc. In a third manner, the network device configures a value for each codeword, and a same value is configured for same codewords of all carriers, that is, N1 is used for first codewords of all the carriers, and N2 is used for second codewords of all the carriers. In a fourth manner, the network device configures a value for each codeword of each carrier. In a fifth manner, the network device configures a value for each carrier (for example, the network device configures Nc for a $c^{th}$ carrier, that is, the network device requires C pieces of signaling to configure C parameters). When there are two codewords, a maximum CBG sum of the two codewords of the $c^{th}$ carrier is Nc. In a sixth manner, the network device configures a value N for all carriers. When there are two codewords, a maximum CBG sum of the two codewords is N. Any one of the foregoing manners is applicable to this application. For ease of description, the second manner is used to describe this application.

For ease of description, in this application, one-carrier one-codeword transmission is used as an example for description. The solution provided in this application is also applicable to a case of multi-carrier multi-codeword, and a similar processing procedure and similar feedback information may be obtained. This is not described in detail in this application.

Dynamic HARQ-ACK feedback codebook: When only one carrier is configured, a downlink assignment index (DAI) exists in each piece of DCI, and the DAI may also be referred to as a counter downlink assignment index (C-DAI).

The terminal determines a codebook size based on DCI detected in a HARQ multiplexing window (specifically, in an implementation, the terminal determines the codebook size based on a DAI value in last detected DCI), and arranges HARQ-ACK information of a TB at a location corresponding to a DAI value in DCI for scheduling the TB.

Figure 3:
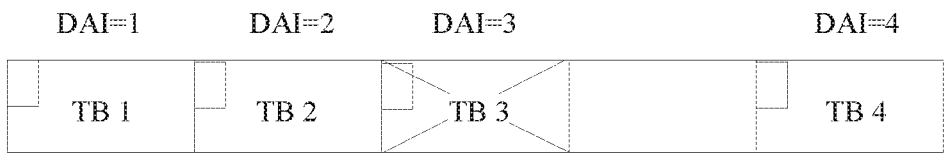
FIG. 3 is a schematic diagram of data transmission according to an embodiment of this application.

FIG. 3 is a schematic diagram of data transmission according to an embodiment of this application. As shown in FIG. 3, the HARQ multiplexing window includes five time units. It is assumed that RRC signaling of the carrier disables CBG-level feedback (in other words, TB-level feedback is used in LTE), and a codeword quantity is 1. The terminal detects no DCI scheduled in the third time unit. Based on this, it is determined that a size of a HARQ-ACK feedback codebook is 4 bits (because the last detected DAI value is 4). The first bit is HARQ-ACK information (DAI=1) of a TB 1, the second bit is HARQ-ACK information (DAI=2) of a TB 2, and the fourth bit is a HARQ-ACK (DAI=4) of a TB 4. Then the third bit is set to a NACK (because the DCI is lost, and the terminal fails to detect the DCI). A small box in an upper left corner of each time unit represents DCI for scheduling corresponding data transmission. It should be noted that the DCI (PDCCH) for scheduling data (PDSCH) transmission may be in one time unit, or may not be in one time unit.

Figure 4:
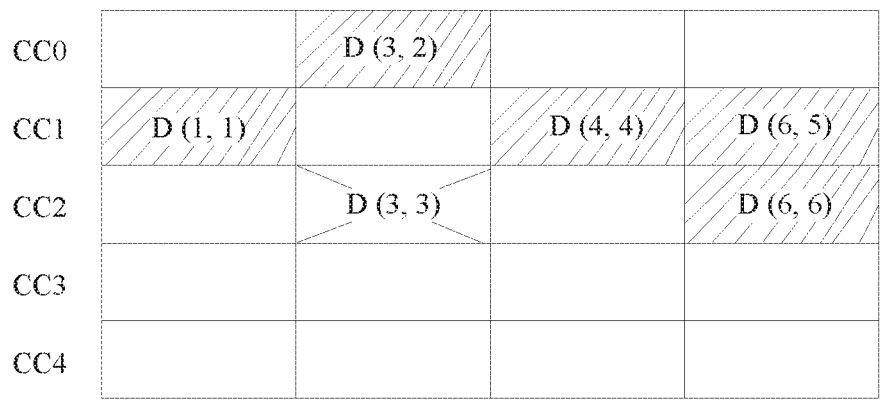
FIG. 4 is a schematic diagram of data transmission according to another embodiment of this application.

When more than one carrier is configured, two DAIs (one is a C-DAI, and the other is a total downlink assignment index (Total Downlink Assignment Index, T-DAI)) exist in each piece of DCI. T-DAIs of all carriers in one time unit are equal to each other. The terminal determines a codebook size based on DCI detected in a HARQ multiplexing window (in a possible manner, the terminal determines the codebook size based on a DAI value in last detected DCI), and arranges HARQ-ACK information of a TB at a location corresponding to a DAI value in DCI for scheduling the TB. FIG. 4 is a schematic diagram of data transmission according to another embodiment of this application. As shown in FIG. 4, five carriers are configured, a HARQ multiplexing window includes four time units, a blank box indicates that there is no PDSCH transmission, and a remaining stripe box indicates that there is PDSCH transmission. In the first time unit of the HARQ multiplexing window, only a carrier 1 has data scheduling, so that total DAI=1 and counter DAI=1. In the second time unit of the HARQ multiplexing window, there is data transmission on both a carrier 0 and a carrier 3. In this case, if data transmission in the first time unit is added, T-DAI=3, C-DAI=2 on the carrier 0, and C-DAI=3 on a carrier 2. T-DAIs and C-DAIs of the third subframe and the fourth subframe may be successively obtained. A final size of a HARQ-ACK feedback codebook is 6 bits, the HARQ-ACK feedback codebook is 110111, and corresponding PDSCHs or TBs are in a sequence of first frequency domain and then time domain. To be specific, HARQ-ACK information of a TB corresponding to DCI whose DAI value is D (1, 1) is the first bit, HARQ-ACK information of a TB corresponding to DCI whose DAI value is D (3, 2) is the second bit, and so on. It should be noted that the DAI is counted based on first frequency domain and then time domain.

It should be noted that although values of the T-DAI and the C-DAI in the examples provided in this application each are 1, 2, 3, 4, 5, or 6, this is for ease of description. Optionally, values of the T-DAI and the C-DAI in the DCI depend on quantities of bits occupied by a T-DAI field and a C-DAI field in the DCI. For example, in LTE, it is assumed that both the T-DAI field and the C-DAI field occupy two bits, where 1 is represented by 00, 2 is represented by 01, 3 is represented by 10, 4 is represented by 11, 5 is represented by 00, 6 is represented by 01, and so on. Therefore, a specific value of the T-DAI needs to be calculated based on a quantity of cycles. For example, if the T-DAI field is cycled once and the T-DAI field is 01, it indicates that the value of the T-DAI is 6. If the T-DAI field is cycled twice and the T-DAI field is 10, it indicates that the value of the T-DAI is 11. A case for the C-DAI is similar to this, and details are not described. For details, refer to Table 1.

TABLE 1

| DAI field information | DAI value, C-DAI value, or T-DAI value corresponding to the DAI field | Actual DAI/C-DAI/T-DAI value Z (that is, there is PDSCH transmission (for example, scheduled by a PDCCH) related to the PDCCH, and/or there is a quantity of {carrier, time unit} pairs used to indicate a PDCCH released through semi-persistent scheduling (SPS)) |
|---|---|---|
| 0, 0 | 1 | $\mod(Z - 1, 4) + 1 = 1$ |
| 0, 1 | 2 | $\mod(Z - 1, 4) + 1 = 2$ |
| 1, 0 | 3 | $\mod(Z - 1, 4) + 1 = 3$ |
| 1, 1 | 4 | $\mod(Z - 1, 4) + 1 = 4$ |

In the table, mod( ) represents a REM operation. In addition, when the network device configures CBG-level transmission and CBG feedback for the terminal device through RRC signaling, and configures a maximum quantity of CBGs as N, in a possible manner, a dynamic codebook size may be obtained by multiplying a size obtained above by N (N may be a largest value in maximum CBG values configured for carriers, and for a carrier for which CBG feedback is not enabled, it may be considered as a maximum CBG value of the carrier is 1). The first M bits in N bits at a location corresponding to each TB correspond to HARQ-ACK information of each CBG of the TB, and the following (N−M) bits may be NACKs by default.

It should be noted that the T-DAI and the C-DAI unnecessarily named the T-DAI and the C-DAI in specific application, provided that they can index a quantity of time units. In addition, in a specific implementation solution, the T-DAI and the C-DAI may not need to simultaneously exist, and instead, only one DAI may be required, and the DAI can be referred to as the DAI. This manner is particularly applicable to an application scenario in which each carrier determines HARQ-ACK information of the carrier or only one carrier is configured.

To improve retransmission efficiency, the network device may configure CBG-level transmission and CBG feedback for the terminal device through RRC signaling, and configure a maximum quantity of CBGs as N. This application is not limited to performing CBG-level transmission and CBG feedback through RRC signaling. For example, configuration signaling in this application may be one or more of RRC signaling, a master information block (MIB) message, a SIB message, MAC CE signaling, and other physical layer signaling. Details are not described below.

Figure 5:
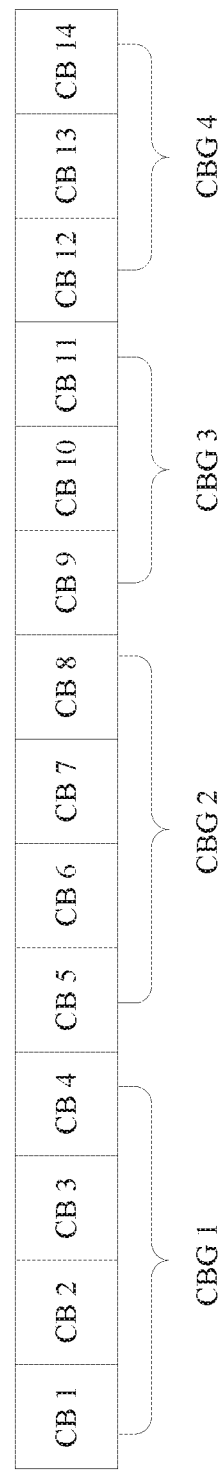
FIG. 5 is a schematic diagram of data transmission according to still another embodiment of this application.

If one TB includes C CBs, a quantity of CBGs actually included in the TB is M=min(C, N), where min( ) indicates that a minimum value is taken. Quantities of CBs in the M CBGs are equally divided as far as possible. To be specific, the first N+=C % M CBGs each include ceil(C/M) CBs, and the following N−=M−C % M CBGs each include floor(C/M) CBs, where "%" indicates an REM operation, "/" indicates dividing, ceil( ) indicates rounding up, and floor( ) indicates rounding down. FIG. 5 is a schematic diagram of data transmission according to still another embodiment of this application. As shown in FIG. 5, C=14, M=4, N+=4, and N−=2

To support CBG-level transmission, a new DCI format (denoted as a DCI format X in this application) needs to be defined. The DCI format X includes an N-bit CBG transmission indication (CBG TI) used to indicate which CBGs are scheduled. For example, 1 is used to indicate that a CBG is scheduled, and 0 is used to indicate that a CBG is not scheduled (or on the contrary, 0 may be used to indicate a CBG is scheduled, and 1 may be used to indicate that a CBG is not scheduled). When N=4, 1010 indicates that the first CBG and the third CBG are currently scheduled.

After the network device configures and enables CBG-level transmission and CBG feedback through RRC, to support a manner of flexibly controlling feedback overheads, UCI decoding performance, and uplink coverage, in the NR, it is proposed that dynamic backoff to TB-level feedback may be supported. Specifically, there may be at least the following several possible dynamic indication manners.

1. The terminal detects a backoff DCI format (in this application, the DCI format is denoted as a DCI format Y). The DCI format Y does not include the CBG TI. The backoff DCI format is a system-defined DCI format, for example, 1A/0A in LTE. In this case, the terminal determines that TB-level transmission/retransmission is currently performed, and feeds back one-bit TB-level HARQ-ACK information.

2. The terminal detects a DCI format X for scheduling CBG-level transmission/retransmission. The DCI format X is the new DCI format defined to support CBG-level transmission. The DCI format X includes an N-bit CBG TI, and the N-bit CBG TI indicates a state (for example, the N bits are all 0), indicating that no data is scheduled. Therefore, the state is redundant and meaningless. Therefore, the CBG TI of N bits that are all 0s may also be used to indicate that TB-level transmission is currently performed, and one-bit TB-level HARQ-ACK information is fed back.

3. If the terminal detects DCI in common search space or a predefined/preconfigured control resource set, the terminal determines that TB-level transmission/retransmission is currently performed, and feeds back one-bit TB-level HARQ-ACK information.

For convenience, in this application, one or more of the foregoing DCI forms (or other possible DCI forms) used to indicate to feed back one-bit TB-level HARQ-ACK information are referred to as second DCI, and corresponding DCI used to indicate to feed back CBG-level HARQ-ACK information is referred to as second DCI. To be specific, the first DCI is used to indicate to feed back CBG-level HARQ-ACK information for data scheduled by using the first DCI. The second DCI is used to indicate to feed back TB-level HARQ-ACK information for data scheduled by using the second DCI. This is not described in detail in this application.

Currently, DCI based on TB-level transmission and TB-level feedback is performed for one TB or two codewords in MIMO, and there is no TB-level feedback backoff mechanism for HARQ multiplexing. How to transmit a HARQ-ACK feedback codebook in HARQ-ACK multiplexing is a technical problem to be urgently resolved in this application.

Figure 6:
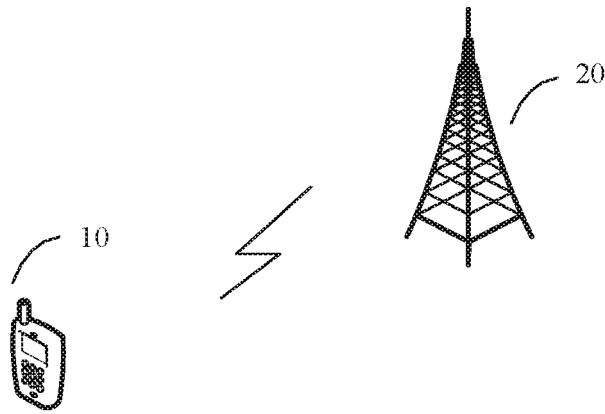
FIG. 6 is a schematic diagram of a network architecture according to an embodiment of this application.

To resolve the technical problem, this application provides a method and an apparatus for sending a HARQ-ACK feedback codebook and a device. FIG. 6 is a schematic diagram of a network architecture according to an embodiment of this application. The technical solutions provided in this application are based on the network architecture shown in FIG. 6. The network architecture includes at least one terminal 10, and the terminal 10 communicates with a network device 20 through a wireless interface. For clarity, only one terminal and one network device are shown in FIG. 6.

A terminal in this application is a device that has a wireless transmission/reception function. The terminal may be deployed on land, for example, an indoor or outdoor device, a handheld device, or an in-vehicle device; or may be deployed on a water surface (for example, on a ship); or may be deployed in the air (for example, on a plane, a balloon, or a satellite). The terminal may be a mobile phone, a tablet computer (pad), a computer with a wireless transmission/reception function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

A network device in this application is a device enabling a terminal to access to a wireless network. The network device includes but is not limited to an evolved NodeB (eNB), a home base station (for example, a Home Evolved NodeB, or a Home NodeB, HNB), a baseband unit (BBU), a gNodeB (gNB), a transmission and reception point (TRP), and a transmission point (TP). In addition, the network device may further include a Wi-Fi access point (AP) and the like.

It should be noted that the network architecture described in this application is intended to describe the technical solutions in this application more clearly, but are not intended to limit the technical solutions provided in this application. A person of ordinary skill in the art may know that as the network architecture evolves and a new service scenario emerges, the technical solutions provided in this application are also applied to a similar technical problem.

The technical solutions in this application may be applied to, but are not applied only to, an evolved system of a fourth generation mobile communications system (4 Generation, 4G) or a fifth generation mobile communications system (5 Generation, 5G), for example, may be applied to an LTE system or an NR system.

Based on the foregoing content, a method for sending a HARQ feedback codebook, a terminal, and a network device provided in this application are described below in detail.

Figure 7:
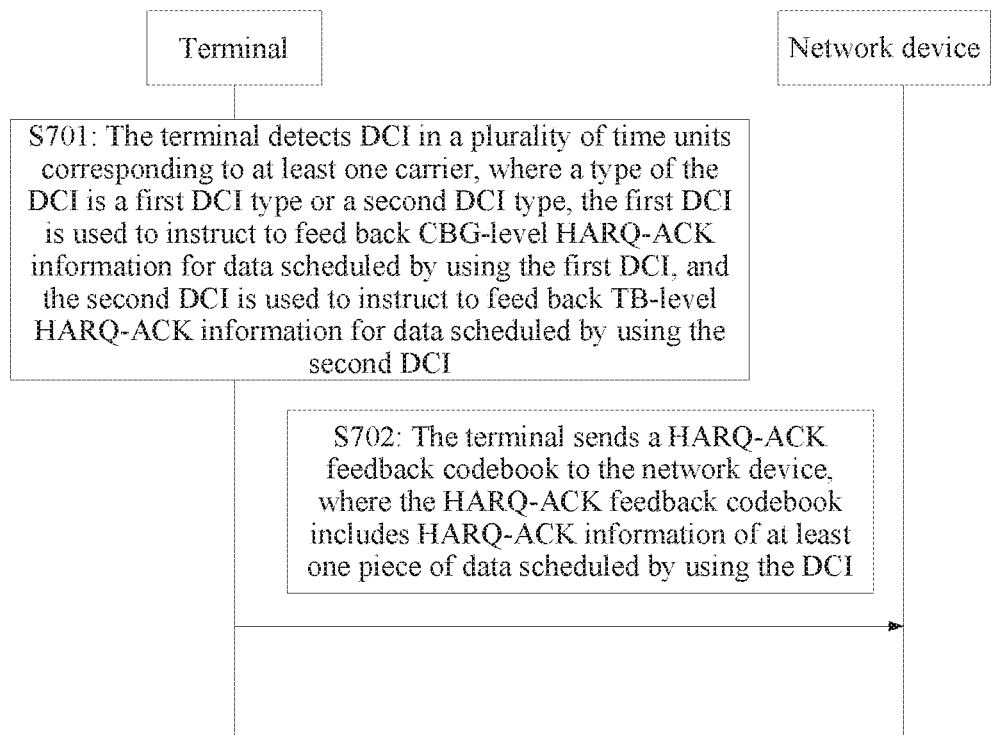
FIG. 7 is a flowchart of a method for sending a HARQ-ACK feedback codebook according to an embodiment of this application.

Specifically, FIG. 7 is a flowchart of a method for sending a HARQ-ACK feedback codebook according to an embodiment of this application. An application scenario of this application is the HARQ multiplexing described above. A network element in the method is a terminal. As shown in FIG. 7, the method includes the following procedure.

Step S701: The terminal detects DCI in a plurality of time units corresponding to at least one carrier, where a type of the DCI is a first DCI type or a second DCI type, the first DCI is used to indicate to feed back CBG-level HARQ-ACK information for data scheduled by using the first DCI, and the second DCI is used to indicate to feed back TB-level HARQ-ACK information for data scheduled by using the second DCI.

Step S702: The terminal sends a HARQ-ACK feedback codebook to a network device, where the HARQ-ACK feedback codebook includes HARQ-ACK information of at least one piece of data scheduled by using the DCI.

The HARQ-ACK feedback codebook is determined based on the type of the DCI and a type of the HARQ-ACK feedback codebook, and the type of the HARQ-ACK feedback codebook is a semi-persistent type or a dynamic type.

Optionally, the HARQ-ACK feedback codebook includes HARQ-ACK information of at least one piece of data scheduled by using the first DCI and HARQ-ACK information of at least one piece of data scheduled by using the second DCI.

Step S701 is described in detail as follows: A size or a bit quantity of the HARQ-ACK feedback codebook is determined by the type of the HARQ-ACK feedback codebook, or is determined by the type of the DCI and the type of the HARQ-ACK feedback codebook. Each HARQ-ACK information bit in the HARQ-ACK feedback codebook is specifically determined by the type of the DCI, or is determined by the type of the DCI and the type of the HARQ-ACK feedback codebook. For example, if a TB is scheduled by using the first DCI, HARQ-ACK information of the TB is CBG-level HARQ-ACK information; if a TB is scheduled by using the second DCI. HARQ-ACK information of the TB is TB-level HARQ-ACK information.

The CBG-level HARQ-ACK information means that the HARQ-ACK information includes HARQ-ACK information of a CBG included in a TB scheduled by using the DCI. Therefore, the CBG-level HARQ-ACK information usually occupies a plurality of bits, and each CBG corresponds to one-bit HARQ-ACK information. For example, if a maximum quantity of CBGs configured by the network device is N, and a quantity of CBGs included in the TB is M, N-bit HARQ-ACK information is fed back. Each bit of the first M bits in the N bits corresponds to HARQ-ACK information of one CBG (when all CBs included in the CBG are successfully decoded, the bit is an ACK; otherwise, the bit is a NACK), and the following (N−M) bits are optionally NACKs (or other possible values such ACKs, and this is not limited in this application).

The TB-level HARQ-ACK information means that the HARQ-ACK information is HARQ-ACK information of a TB, and the TB-level HARQ-ACK information occupies one bit (when all CBs included in the TB are successfully decoded and a CRC check of the TB succeeds, the bit is an ACK; otherwise, the bit is a NACK). For example, although it is assumed that a maximum quantity of CBGs configured by the network device is N, the TB actually needs to occupy only one bit to send the TB-level HARQ-ACK information.

In this application, that the terminal detects DCI in a plurality of time units corresponding to at least one carrier includes the following several possibilities: The terminal detects the DCI in a plurality of time units corresponding to one carrier, detects the DCI in a plurality of time units corresponding to a plurality of carriers, and the like.

Step S702 is described in detail as follows: The terminal sends the HARQ-ACK feedback codebook to the network device based on the detected DCI. In this application, the DCI has a function in the prior art, that is, the DCI may be used to schedule data.

When all DCI detected by the terminal in the plurality of time units corresponding to the at least one carrier are the first DCI, the HARQ-ACK feedback codebook is a CBG-level HARQ-ACK feedback codebook in the prior art. When at least one piece of DCI detected by the terminal in the plurality of time units corresponding to the at least one carder is the second DCI, HARQ-ACK information that is in the HARQ-ACK feedback codebook and that is at a location corresponding to second data indicated by the second DCI is TB-level HARQ-ACK information.

This application provides a method for sending a HARQ-ACK feedback codebook. In this application, the type of the DCI detected in the plurality of time units corresponding to the at least one carrier is considered. When the type of the DCI is the second DCI type, the HARQ-ACK feedback codebook includes the HARQ-ACK information of the second data scheduled by using the second DCI. To be specific, this application provides a TB-level feedback back-off mechanism in a HARQ multiplexing scenario.

A case of one-carrier one-codeword is used as an example below (a case of multi-carrier two-codeword is similar to the case of one-carrier one-codeword, and is not described in detail in this application). When the HARQ-ACK feedback codebook includes HARQ-ACK information corresponding to first data scheduled based on the first DCI and HARQ-ACK information corresponding to second data scheduled based on the second DCI, arrangements of the HARQ-ACK information corresponding to the second data in the HARQ-ACK feedback codebook and a method for determining the HARQ-ACK feedback codebook based on each arrangement are as follows.

Case 1: If the first data is scheduled based on the first DCI, the first M bits in N bits that are in the HARQ-ACK feedback codebook and that correspond to the first data are code block group CBG-level HARQ-ACK information of the first data, and the following (N−M) bits in the N bits are optionally negative acknowledgements NACKs. N is a maximum quantity of CBGs configured by the network device for the data (the network device configures a same maximum quantity of CBGs for all data on a same carrier, and therefore a maximum quantity of CBGs configured for data in this application is a maximum quantity of CBGs configured for data on a carrier on which the data is located), and M is a quantity of CBGs actually included in a TB scheduled by using the DCI. If the second data is scheduled by using the second DCI, the first bit in N bits in the HARQ-ACK feedback codebook that correspond to the second data is TB-level HARQ-ACK information of the second data, and each of the following (N−1) bits in the N bits is a NACK or TB-level HARQ-ACK information.

In this manner, the network device may flexibly use the second DCI to indicate the terminal device to back off to TB-level feedback. Further, the terminal device writes (N−1) bits as a default NACK, and a total codebook size is the same as that existing when the terminal does not back off to TB-level feedback. A known NACK is introduced, so as to help the network device decode UCI, thereby improving coverage/decoding performance of uplink UCI. In addition, the total codebook size remains unchanged, and a location of HARQ-ACK information corresponding to each TB is also determined. Therefore, even if DCI is lost, a location and an arrangement of HARQ-ACK information of other data are not affected, so as to ensure that the HARQ-ACK information of the other data can be correctly received, thereby improving system robustness.

The first data is any data that is in the at least one piece of data and that is scheduled based on the first DCI, and the second data is any data that is in the at least one piece of data and that is scheduled based on the second DCI.

Figure 8:
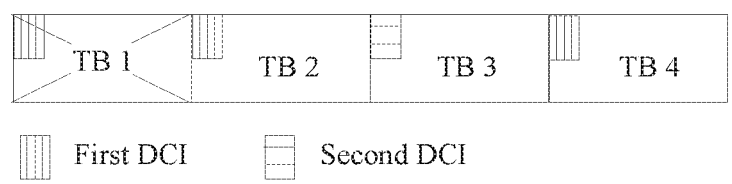
FIG. 8 is a schematic diagram of data transmission according to an embodiment of this application.

1. The HARQ-ACK feedback codebook may be a semi-persistent HARQ-ACK feedback codebook. If the second DCI is detected in a time unit in a HARQ multiplexing window on a carrier, the first bit in N bits at a location corresponding to the second data scheduled by using the second DCI is TB-level HARQ-ACK information corresponding to the second data, and each of the following (N−1) bits may be a default NACK or TB-level HARQ-ACK information. For example, FIG. 8 is a schematic diagram of data transmission according to an embodiment of this application, FIG. 9A is a schematic diagram of a HARQ-ACK feedback codebook according to an embodiment of this application, and FIG. 9B is a schematic diagram of a HARQ-ACK feedback codebook according to another embodiment of this application. Descriptions are provided with reference to FIG. 8, FIG. 9A, and FIG. 9B. It is assumed that a quantity of configured carriers is 1, the network device enables a CBG transmission and feedback mode for the carrier and configures that N=2 through RRC, a size of a HARQ multiplexing window on the carrier is 4, one-codeword transmission is used, and data transmission detected in the HARQ multiplexing window is shown in FIG. 8. In this case, the terminal device generates a semi-persistent HARQ-ACK feedback codebook shown in FIG. 9A or FIG. 9B, and a size of the codebook is 8 bits. All HARQ-ACK information of the first TB, corresponding to the first and second bits is a NACK (because DCI used to schedule the TB is lost), the third and fourth bits correspond to CBG-level HARQ-ACK information of the second TB (the TB is scheduled by using the first DCI, and it is assumed that a quantity of CBGs of the TB is 2), the fifth bit corresponds to TB-level HARQ-ACK information of the third TB (the TB is scheduled by using the second DCI), the sixth bit may be a default NACK, or may be the TB-level HARQ-ACK information of the third TB again, and the seventh and eighth bits correspond to CBG-level HARQ-ACK information of the fourth TB (the TB is scheduled by using the first DCI, and it is assumed a quantity of CBGs of the TB is 2).

The "location corresponding to the second data" and a "location corresponding to the first data" depend on an arrangement manner of the semi-persistent feedback codebook. For example, in LTE, the location depends on a number of a carrier carrying the "first data" and the "second data" and a location of a time unit that is in a feedback window and that carries the "first data" and the "second data". For example, in FIG. 8, a time unit carrying a TB 1 is the first location in the feedback window on the carrier, and therefore the first N bits correspond to CBG-level HARQ-ACK information of the TB. A time unit carrying a TB 4 is the fourth location in the feedback window on the carrier, and therefore the fourth N bits correspond to CBG-level HARQ-ACK information of the TB. Certainly, another arrangement manner is also applicable to this application. This is not limited in this application.

It should be noted that the foregoing is described by using a single carrier as an example. Optionally, in a multi-carrier case, each carrier is applicable to the example of the single carrier. The multi-carrier case is not described in detail in this application.

For a case of multi-carrier multi-codeword or single-carrier multi-codeword, each codeword may be considered as one TB, and the foregoing method may also be used for all codewords (or referred to as all TBs) in a HARQ multiplexing window. This is not described in detail in this application.

It should be particularly emphasized that the first data and the second data are data on one carrier. When a plurality of carriers are configured, the first data and the second data may be data on different carriers.

Further, when the HARQ-ACK feedback codebook is the semi-persistent HARQ-ACK feedback codebook, the size of the HARQ-ACK feedback codebook is determined based on at least a quantity of the at least one carrier, a quantity of the plurality of time units, and a maximum quantity of CBGs configured by the network device for each carrier.

For example, it is assumed that single-codeword transmission is used for all carriers. A carrier i corresponds to Ti time units, and a maximum quantity of CBGs corresponding to the carrier i is Ni. Assuming that there are L carriers in total, a finally determined size of the semi-persistent HARQ-ACK feedback codebook is T1*N1+T2*N2+ ... TL*NL, where N1, N2 ... , and NL may be configured through one piece of signaling or different pieces of signaling. Time unit set sizes Ti of the carriers may also be the same or different. This is not limited in this application.

For example, in a MIMO scenario (that is, a case of multi-codeword transmission), a carrier i corresponds to Ti time units, and a maximum quantity of CBGs corresponding to the carrier i is Ni (it is assumed that a same maximum quantity of CBGs is configured for two codewords of a same carrier). It is assumed that there are L carriers in total, and a quantity of codewords corresponding to the carrier i is Ki (Ki=2 if at least one two-codeword transmission exists in the $i^{th}$ carrier time unit and a HARQ-ACK bundling manner is not used in the $i^{th}$ carrier time unit; otherwise Ki=1). A finally determined size of the semi-persistent HARQ feedback codebook is T1*N1*K1+T2*N2*K2+ ... TL*NL*KL.

Figure 10:
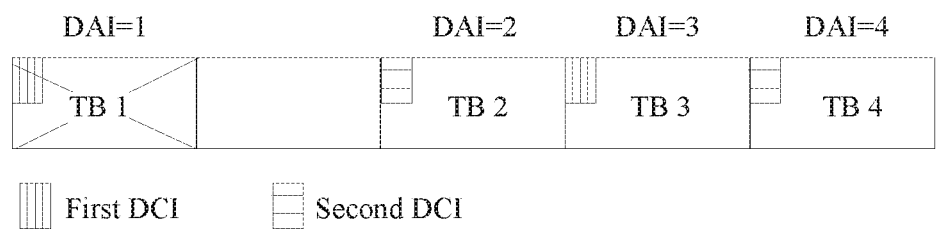
FIG. 10 is a schematic diagram of data transmission according to an embodiment of this application.

2. The HARQ-ACK feedback codebook may be a dynamic HARQ-ACK feedback codebook. A single-carrier case is described. Both the first DCI and the second DCI have a DAI field, and the DAI fields are counted together. FIG. 10 is a schematic diagram of data transmission according to an embodiment of this application, and FIG. 11 is a schematic diagram of a HARQ-ACK feedback codebook according to an embodiment of this application. Descriptions are provided with reference to FIG. 10 and FIG. 11. If the second DCI is detected in a time unit in a HARQ multiplexing window on a carrier, the first bit in N bits at a location corresponding to the second data scheduled by using the second DCI is TB-level HARQ-ACK information corresponding to the second data, and each of the following (N−1) bits may be a default NACK or TB-level HARQ-ACK information.

The "location corresponding to the second data" and a "location corresponding to the first data" depend on an arrangement manner of the dynamic feedback codebook. For example, in LTE, the location depends on a DAI value in DCI for scheduling the "first data" and the "second data". For example, in FIG. 10, a DAI value in DCI for scheduling a TB 3 is equal to 3, and therefore the third N bits correspond to CBG-level HARQ-ACK, information of the TB. A DAI value in DCI for scheduling a TB 4 is equal to 4, and therefore the first bit of the fourth N bits corresponds to TB-level HARQ-ACK information of the TB. Certainly, another arrangement manner is also applicable to this application. This is not limited in this application. In a possible manner, only a DAI field may exist in single-carrier DCI. A C-DAI field and a T-DAI field may exist in multi-carrier DCI, and a corresponding location is determined by the C-DAI.

It should be noted that the foregoing is described by using a single carrier as an example. Actually, in a multi-carrier case, each carrier is applicable to the example of the single carrier. The multi-carrier case is not described in detail in this application.

In a case of multi-carrier multi-codeword or single-carrier single-codeword, each codeword may be considered as one TB, and the foregoing method may also be used for all codewords (or referred to as all TBs) in a HARQ multiplexing window. This is not described in detail in this application.

It should be particularly emphasized that the first data and the second data are data on one carrier. When a plurality of carriers are configured, the first data and the second data may be data on different carriers.

Further, when the HARQ-ACK feedback codebook is the dynamic HARQ-ACK feedback codebook, the size of the HARQ-ACK feedback codebook is determined based on at least a DAI value in the DCI and a maximum quantity of CBGs configured by the network device for each carrier.

In a case of single-carrier single-codeword, the size of the HARQ-ACK feedback codebook is a product of the last DAI value and a maximum quantity N of CBGs configured by the network device for the carrier.

For example, a maximum DAI value corresponding to a carrier i is 4, and a maximum quantity of CBGs configured for the carrier is 5. In this case, a finally determined size of the HARQ-ACK feedback codebook is 20.

In a case of multi-carrier single-codeword, the size of the HARQ-ACK feedback codebook is a product of the last T-DAI value and a maximum quantity of CBGs configured by the network device for the carrier.

In a MIMO scenario (that is, a case of multi-codeword transmission), the size of the HARQ-ACK feedback codebook is determined based on a DAI value in DCI, a maximum quantity of CBGs configured by the network device for each carrier, and a quantity of codewords.

For example, a maximum quantity of CBGs corresponding to a carrier i is 5, a maximum DAI is 4, and a quantity of codewords is 2 (if a time unit in a time window on at least one carrier carries two codewords and a HARQ-ACK bundling manner is not used in the time unit, the quantity of codewords is 2; otherwise, the quantity of codewords is 1). In this case, a finally determined size of the dynamic HARQ-ACK feedback codebook is 5*4*2=40.

Case 2: All HARQ-ACK information included in the HARQ-ACK feedback codebook is CBG-level HARQ-ACK information.

1. When the network device configures a semi-persistent codebook mode, although the terminal device detects the second DCI in a HARQ multiplexing window, the terminal device still uses CBG-level feedback. To be specific, in a HARQ-ACK multiplexing case, compared with the second DCI, CBG feedback and CBG transmission configured through RRC have a higher priority, and TB-level backoff indicated by the second DCI takes effect only in a non-HARQ-ACK multiplexing case.

In this case, a method for determining the size of the HARQ-ACK feedback codebook is the same as a method for determining the size of the HARQ-ACK feedback codebook in the prior art, because the HARQ-ACK feedback codebook is actually a CBG-level HARQ-ACK feedback codebook. In this manner, a total codebook size remains unchanged, and a location of HARQ-ACK information corresponding to each TB is also determined. Therefore, even if DCI is lost, a location and an arrangement of HARQ-ACK information of other data are not affected, so as to ensure that the HARQ-ACK information of the other data can be correctly received, thereby improving system robustness.

This case is also applicable to a multi-carrier case, a multi-carrier multi-codeword case, or the like. This is not described in detail in this application.

2. When the network device configures a dynamic codebook mode, although the terminal device detects the second DCI in a HARQ multiplexing window, the terminal device still uses CBG-level feedback. To be specific, compared with the second DCI, CBG feedback and CBG transmission configured through RRC have a higher priority, and TB-level backoff indicated by the second DCI takes effect only in a non-HARQ-ACK multiplexing case.

Similarly, in this case, a method for determining the size of the HARQ-ACK feedback codebook is the same as a method for determining the size of the HARQ-ACK feedback codebook in the prior art, because the HARQ-ACK feedback codebook is actually still a CBG-level HARQ-ACK feedback codebook.

This case is also applicable to a multi-carrier case, a multi-carrier multi-codeword case, or the like. This is not described in detail in this application.

Case 3: The terminal determines the size of the HARQ-ACK feedback codebook. If the determined size of the HARQ-ACK feedback codebook is less than a preset threshold, the first bit in N bits in the HARQ-ACK feedback codebook that correspond to the second data is TB-level HARQ-ACK information of the second data, and each of the following (N−1) bits in the N bits is a NACK or TB-level HARQ-ACK information; or if the determined size of the HARQ-ACK feedback codebook is greater than or equal to a preset threshold, the first N1 bits in N bits that are in the HARQ-ACK feedback codebook and that correspond to the second data are CBG-level HARQ-ACK information of the second data, and the following (N−M) bits in the N bits are optionally negative acknowledgments NACKs. N is a maximum quantity of CBGs configured by the network device for the second data, and M is a quantity of CBGs actually included in a TB corresponding to the second data. The second data is any data that is in the at least one piece of data and that is scheduled based on the second DCI.

Optionally, the terminal determines a size of a semi-persistent HARQ-ACK feedback codebook. The preset threshold may be 12 bits. If the size of the semi-persistent HARQ-ACK feedback codebook is less than 12 bits, TB-level feedback is used, that is, the first bit in N bits in the HARQ-ACK feedback codebook that correspond to the second data is TB-level HARQ-ACK information of the second data, and each of the following (N−1) bits in the N bits is a NACK or TB-level HARQ-ACK information; or if the determined size of the HARQ-ACK feedback codebook is greater than or equal to 12 bits, CBG feedback is used, that is, the first M bits in N bits that are in the HARQ-ACK feedback codebook and that correspond to the second data are CBG-level HARQ-ACK information of the second data, and the following (N−M) bits in the N bits are negative acknowledgments NACKs. A reason for using this embodiment is as follows: When UCI is less than 12 bits, RM encoding is used for the UCI, and a predicted NACK of (N−1) bits may be introduced when backoff TB-level feedback is used based on an indication of the second DCI. This helps decode the UCI, thereby improving coverage/decoding performance of uplink UCI. When UCI is greater than or equal to 12 bits, polar encoding is used for the UCI, and a predicted NACK of (N−1) bits is introduced when backoff TB-level feedback is used based on an indication of the second DCI. This has no help in decoding the UCI, and therefore TB-level feedback backoff indicated by the second DCI may not take effect.

It should be noted that in Case 3, an execution solution is actually selected from Case 1 and Case 2, and Case 3 is applicable to both the semi-persistent HARQ-ACK feedback codebook and the dynamic HARQ-ACK feedback codebook. If the determined size of the HARQ-ACK feedback codebook is less than the preset threshold, Case 3 is Case 1. Based on this, a method for determining the size of the HARQ-ACK feedback codebook may be the method provided in Case 1. If the determined size of the HARQ-ACK feedback codebook is greater than or equal to a preset threshold, Case 3 is Case 2. Based on this, a method for determining the size of the HARQ-ACK feedback codebook may be the method provided in Case 2. This is not described in detail in this application.

This solution is also applicable to a multi-carrier case, a multi-carrier multi-codeword case, or the like. This is not described in detail in this application.

Case 4: If the type of the HARQ-ACK feedback codebook is the dynamic type, the HARQ-ACK feedback codebook includes a first sub-codebook and/or a second sub-codebook. The first sub-codebook includes CBG-level HARQ-ACK information of data scheduled based on the first DCI, and the second sub-codebook includes TB-level HARQ-ACK information of data scheduled based on the second DCI.

Optionally, the first M bits in N bits that are in the first sub-codebook and that are at a location corresponding to the first data are CBG-level HARQ-ACK information of the first data, and the following (N−M) bits in the N bits are NACKs, where N is a maximum quantity of CBGs configured by the network device, and M is a quantity of CBGs included in a TB corresponding to the first data; and one bit, in the second sub-codebook, at a location corresponding to the second data is TB-level HARQ-ACK information of the second data. The first data is any data that is in the at least one piece of data and that is scheduled by using the first DCI, and the second data is any data that is in the at least one piece of data and that is scheduled by using the second DCI.

Figure 12:
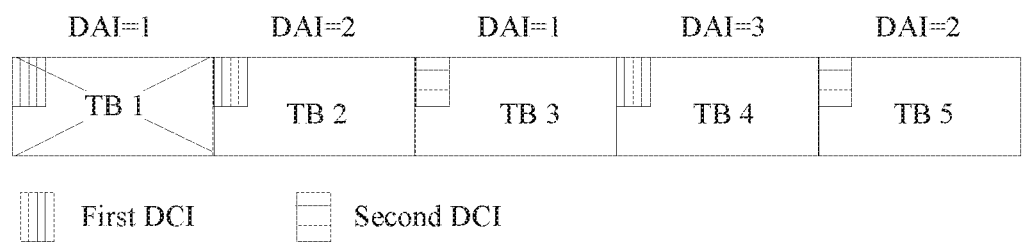
FIG. 12 is a schematic diagram of data transmission according to an embodiment of this application.

In a possible implementation, DAI fields exist in both the first DCI and the second DCI, and the DAI fields are separately counted. The first sub-codebook is generated for data scheduled by using the first DCI, and the second sub-codebook is generated for data scheduled by using the second DCI. The first sub-codebook and the second sub-codebook may be carried in two pieces of UCI and separately fed back, or may be combined to form one piece of UCI, for example, may be connected in series to form one piece of UCI and fed back (optionally, the first sub-codebook is before the second sub-codebook, or the second sub-codebook is before the first sub-codebook). FIG. 12 is a schematic diagram of data transmission according to an embodiment of this application. As shown in FIG. 12, TBs scheduled by using the first DCI include a TB 2 and a TB 4, and DAIs of the TBs are counted together. TBs scheduled by using the second DCI include a TB 3 and a TB 5, and DAIs of the TBs are counted together. DCI used to schedule a TB 1 is lost. FIG. 13 is a schematic diagram of a HARQ-ACK feedback codebook according to an embodiment of this application. As shown in FIG. 13, N bits that are in the first sub-codebook and that are at locations corresponding to the TB 2 and the TB 4 (the first data) are separately CBG-level HARQ-ACK information of the TB 2 and the TB 4, and one bit, in the second sub-codebook, at a location corresponding to the TB 3 (the second data) is TB-level HARQ-ACK information of the second data. The first data is any data that is in the at least one piece of data and that is scheduled by using the first DCI, and the second data is any data that is in the at least one piece of data and that is scheduled by using the second DCI.

According to the foregoing arrangement of the first sub-codebook and the second sub-codebook, HARQ-ACK information corresponding to each piece of second data occupies one bit instead of N bits in the second sub-codebook, thereby reducing overheads of the HARQ-ACK feedback codebook. In addition, a DAI of the first DCI and a DAI of the second DCI are counted separately to respectively generate the first sub-codebook and the second sub-codebook. The first sub-codebook and the second sub-codebook are arranged separately. Therefore, when DCI is lost, because a quantity of bits occupied by the first sub-codebook remains unchanged, and a location of HARQ-ACK information corresponding to each TB is also determined, even if the DCI is lost (for example, the first piece of DCI in the figure is lost), a location and an arrangement of HARQ-ACK information of other data are not affected, so as to ensure that the HARQ-ACK information of the other data can be correctly received, thereby improving system robustness. Further, a location of HARQ-ACK information corresponding to each TB is also determined in the second sub-codebook. Therefore, even if DCI is lost, a location and an arrangement of HARQ-ACK information of other data are not affected, so as to ensure that the HARQ-ACK information of the other data can be correctly received, thereby improving system robustness.

Optionally, a size of the first sub-codebook is determined based on at least a DAI value in the first DCI and N1; and a size of the second sub-codebook is determined based on at least a DAI value in the second DCI.

Specifically, when data is transmitted by using a single carrier and a single codeword, the size of the first sub-codebook is a product of the last DAI value in the first DCI and N. When data is transmitted by using a single carrier and two codewords (a quantity of codewords is 2 when at least one time unit in a time window on the carrier carries two codewords and a HARQ-ACK bundling manner is not used in the time unit; otherwise, a quantity of codewords is 1), the size of the first sub-codebook is a product of N, 2, and the last DAI value in the first DCI. When data is transmitted by using a plurality of carriers, the size of the first sub-codebook is a product of N and the last T-DAI in all DAIs in the first DCI. Similarly, when data is transmitted by using a plurality of carriers and in a case of two-codeword transmission (a quantity of codewords is 2 when a time unit in a time window on at least one carrier carries two codewords and a HARQ-ACK bundling manner is not used in the time unit; otherwise, a quantity of codewords is 1), the size of the first sub-codebook is a product of N, 2, and the last DAI value in all DAIs in the first DCI. When data is transmitted by using a single carrier and a single codeword, the size of the second sub-codebook is the last DAI value in the second DCI. When data is transmitted by using a single carrier and two codewords (a quantity of codewords is 2 when at least one time unit in a time window on the carrier carries two codewords and a HARQ-ACK bundling manner is not used in the time unit; otherwise, a quantity of codewords is 1), the size of the second sub-codebook is a product of 2 and the last DAI value in the second DCI. When data is transmitted by using a plurality of carriers, the size of the second sub-codebook is the last T-DAI in all DAIs in the second DCI. Similarly, when data is transmitted by using a plurality of carriers and in a case of two-codeword transmission (a quantity of codewords is 2 when a time unit in a time window on at least one carrier carries two codewords and a HARQ-ACK bundling manner is not used in the time unit; otherwise, a quantity of codewords is 1), the size of the second sub-codebook is a product of 2 and the last DAI value in all DAIs in the second DCI.

Figure 14B:
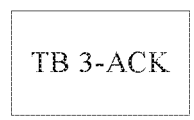
FIG. 14B is a schematic diagram of a HARQ-ACK feedback codebook according to an embodiment of this application.

Case 5: If the type of the HARQ-ACK feedback codebook is the semi-persistent type, and the second DCI is detected, the terminal device feeds back at least two pieces of UCI. The at least two pieces of UCI include at least one piece of UCI that is a semi-persistent codebook. For a manner of generating the semi-persistent codebook, refer to the first point in Case 1. In another possible manner, N bits in the semi-persistent codebook that correspond to the second data scheduled by using the second DCI all may be set to NACKs. FIG. 14A is a schematic diagram of a HARQ-ACK feedback codebook according to an embodiment of this application. As shown in FIG. 14A, the UCI includes CBG-level feedback of the first data scheduled based on the first DCI. Because the DCI used to schedule the TB 1 is lost, first two NACKs are CBG-level feedback corresponding to the TB 1. FIG. 14B is a schematic diagram of a HARQ-ACK feedback codebook according to an embodiment of this application. In addition, the at least two pieces of UCI further include TB-level feedback of the second data scheduled based on the second DCI. A TB 3-ACK indicates TB-level feedback for the TB 3.

If the type of the HARQ-ACK feedback codebook is the dynamic type, and the second DCI is detected, the terminal device feeds back at least two pieces of UCI. The at least two pieces of UCI include at least one piece of UCI that is a dynamic codebook. For a manner of generating the dynamic codebook, refer to the second point in Case 1. In another possible manner, N bits in the dynamic codebook that correspond to the second data scheduled by using the second DCI all may be set to NACKs. In addition, the at least two pieces of UCI further include TB-level feedback of the second data scheduled based on the second DCI.

Case 6: If the type of the HARQ-ACK feedback codebook is the dynamic type, the first DCI and the second DCI are counted together. Different from Case 1, a DAI count is a quantity of actually scheduled CBGs or a quantity of bits that are fed back (rather than a quantity of scheduled PDSCHs/TBs). Because the second DCI needs to feed back a TB-level HARQ-ACK, a DAI may be increased by 1 (which is equivalent to that only one bit needs to be fed back in a case of one codeword, and optionally the DAI is increased by 2 in a case of two codewords, that is, only two bits need to be fed back). If the terminal detects the second DCI, one bit (in a case of one codeword) or two bits (in a case of two codewords) that are fed back at a location corresponding to a DAI value in the DCI are a TB-level HARQ-ACK of data scheduled by using the second DCI.

It should be noted that the foregoing is described by using a single carrier as an example. Actually, in a multi-carrier case, each carrier is applicable to the example of the single carrier. The multi-carrier case is not described in detail in this application.

In a case of multi-carrier multi-codeword or single-carrier single-codeword, each codeword may be considered as one TB, and the foregoing method may also be used for all codewords (or referred to as all TBs) in a HARQ multiplexing window. This is not described in detail in this application.

In conclusion, this application provides the method for sending a HARQ-ACK feedback codebook. In this application, the type of the DCI detected in the plurality of time units corresponding to the at least one carrier is considered. When the type of the DCI is the second DCI type, the HARQ-ACK feedback codebook includes the HARQ-ACK information of the second data scheduled by using the second DCI. To be specific, this application provides a TB-level feedback backoff mechanism in a HARQ-ACK multiplexing scenario. Further, for the HARQ-ACK feedback codebook, in this application, a specific arrangement of the HARQ-ACK information of the second data scheduled by using the second DCI and the size of the HARQ-ACK feedback codebook may be effectively determined.

It should be noted that for ease of description, all examples provided in this application are all cases in which single-carrier single-codeword configuration is assumed. In addition, semi-persistent scheduling (SPS) transmission is not considered. If SPS PDSCH transmission is activated, and the terminal needs to receive an SPS PDSCH in a time window, the HARQ-ACK codebook information may further include decoding result information fed back through the SPS PDSCH. To be specific, an actual codebook size needs to be obtained by adding, to the foregoing described calculation result, a bit quantity of the decoding result information fed back through the SPS PDSCH, and the codebook information also needs to be obtained by adding, to the foregoing described codebook information, the decoding result information fed back through the SPS PDSCH.

It should be noted that a codebook type in this application includes a dynamic codebook and a semi-persistent codebook. A name of the codebook type is not limited in this application, for example, the codebook type includes a first codebook type or a second codebook type. Specifically, a size of a first codebook (or the semi-persistent codebook) is unrelated to a quantity of actually scheduled PDSCHs/TBs/CBGs, and a size of a second codebook (or the dynamic codebook) is related to a quantity of actually scheduled PDSCHs/TBs/CBGs. In LTE, the codebook type is configured by using a parameter cbgcodebooksizeDetermination=cc (indicating that the codebook type is a semi-persistent codebook type) or cbgcodebooksizeDetermination=DAI (indicating that the codebook type is a dynamic codebook type). A parameter in an NR may be similar to this, or has another name/parameter configuration. In addition, in the foregoing embodiment, that one carrier is configured is used as an example. When a plurality of carriers are configured, optionally, each carrier or carrier group is configured as the first codebook type or the second codebook type. Optionally, a manner of determining codebook information of each carrier or carrier group may be any one of the foregoing cases 1 to 6. Codebooks of the carriers or the carrier groups may also be separately transmitted or cascaded/connected in series for transmission together. Some systems may support only one codebook type (that is, only the first codebook type or the second codebook type exists, and the codebook type does not need to be configured through signaling).

Figure 15:
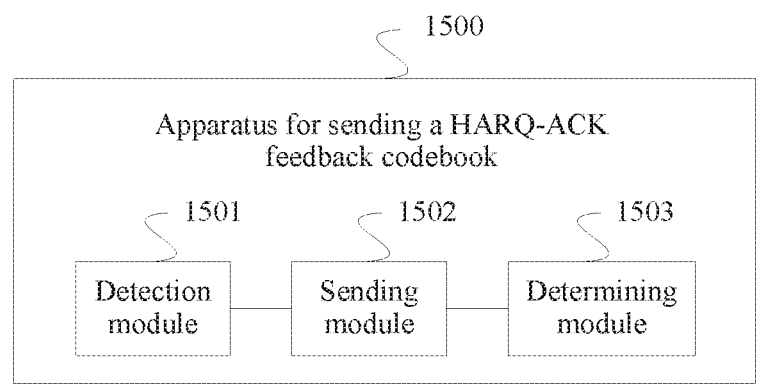
FIG. 15 is a schematic structural diagram of an apparatus 1500 for sending a HARQ-ACK feedback codebook according to an embodiment of this application.

FIG. 15 is a schematic structural diagram of an apparatus 1500 for sending a HARQ-ACK feedback codebook according to an embodiment of this application. As shown in FIG. 15, the apparatus includes:

a detection module 1501, configured to detect downlink control information DCI in a plurality of time units corresponding to at least one carrier, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second DCI is used to indicate to feed back transport block TB-level HARQ-ACK information for data scheduled by using the second DCI; and a sending module 1502, configured to send a HARQ-ACK feedback codebook to a network device, where the HARQ-ACK feedback codebook includes HARQ-ACK information of at least one piece of data scheduled by using the DCI.

The HARQ-ACK feedback codebook is determined based on the type of the DCI and a type of the HARQ-ACK feedback codebook, and the type of the HARQ-ACK feedback codebook is a semi-persistent type or a dynamic type.

Optionally, if first data is scheduled based on the first DCI, the first M1 bits in N1 bits that are in the HARQ-ACK feedback codebook and that correspond to the first data are code block group CBG-level HARQ-ACK information of the first data, and the following (N1−M1) bits in the N1 bits are negative acknowledgments NACKs, where N1 is a maximum quantity of CBGs configured by the network device for the first data, and M1 is a quantity of CBGs actually included in the first data.

If second data is scheduled based on the second DCI, the first bit in N2 bits in the HARQ-ACK feedback codebook that correspond to the second data is TB-level HARQ-ACK information of the second data, and each of the following (N2−1) bits in the N2 bits is a NACK or TB-level HARQ-ACK information, where N2 is a maximum quantity of CBGs configured by the network device for the second data.

The first data is any data that is in the at least one piece of data and that is scheduled based on the first DCI, and the second data is any data that is in the at least one piece of data and that is scheduled based on the second DCI.

Optionally, all HARQ-ACK information included in the HARQ-ACK feedback codebook is CBG-level HARQ-ACK information.

Optionally, the apparatus further includes: a determining module 1503, configured to determine a size of the HARQ-ACK feedback codebook.

If the determined size of the HARQ-ACK feedback codebook is less than a preset threshold, the first bit in N2 bits in the HARQ-ACK feedback codebook that correspond to second data is TB-level HARQ-ACK information of the second data, and each of the following (N2−1) bits in the N2 bits is a NACK or TB-level HARQ-ACK information; or if the determined size of the HARQ-ACK feedback codebook is greater than or equal to a preset threshold, the first M2 bits in N2 bits that are in the HARQ-ACK feedback codebook and that correspond to second data are CBG-level HARQ-ACK information of the second data, and the following (N2−M2) bits in the N2 bits are negative acknowledgments NACKs, where N2 is a maximum quantity of CBGs configured by the network device for the second data, and M2 is a quantity of CBGs actually included in the second data.

The second data is any data that is in the at least one piece of data and that is scheduled based on the second DCI.

Optionally, if the type of the HARQ-ACK feedback codebook is the dynamic type, the HARQ-ACK feedback codebook includes a first sub-codebook and/or a second sub-codebook.

The first sub-codebook includes CBG-level HARQ-ACK information of data scheduled based on the first DCI, and the second sub-codebook includes TB-level HARQ-ACK information of data scheduled based on the second DCI.

Optionally, the first M1 bits in N1 bits that are in the first sub-codebook and that correspond to first data are CBG-level HARQ-ACK information of the first data, and the following (N1−M1) bits in the N1 bits are NACKs, where N1 is a maximum quantity of CBGs configured by the network device for the first data, and M1 is a quantity of CBGs actually included in the first data; and one bit, in the second sub-codebook, corresponding to second data is TB-level HARQ-ACK information of the second data.

The first data is any data that is in the at least one piece of data and that is scheduled based on the first DCI, and the second data is any data that is in the at least one piece of data and that is scheduled based on the second DCI.

Optionally, a size of the first sub-codebook is determined based on at least a downlink assignment index DAI value in the first DCI and N1; and a size of the second sub-codebook is determined based on at least a DAI value in the second DCI.

Optionally, if the type of the HARQ-ACK feedback codebook is the semi-persistent type, the size of the HARQ-ACK feedback codebook is determined based on at least a quantity of the at least one carrier, a quantity of the plurality of time units, and a maximum quantity of CBGs configured by the network device for each carrier.

Optionally, if the type of the HARQ-ACK feedback codebook is the dynamic type, the size of the HARQ-ACK feedback codebook is determined based on at least a downlink assignment index DAI value in the DCI and a maximum quantity of CBGs configured by the network device for each carrier.

The apparatus for sending a HARQ-ACK feedback codebook provided in this application may perform the method for sending a HARQ-ACK feedback codebook performed by the foregoing terminal and an optional manner of the method. An implementation principle and technical effects thereof are similar to those of the method, and details are not described herein again.

Figure 16:
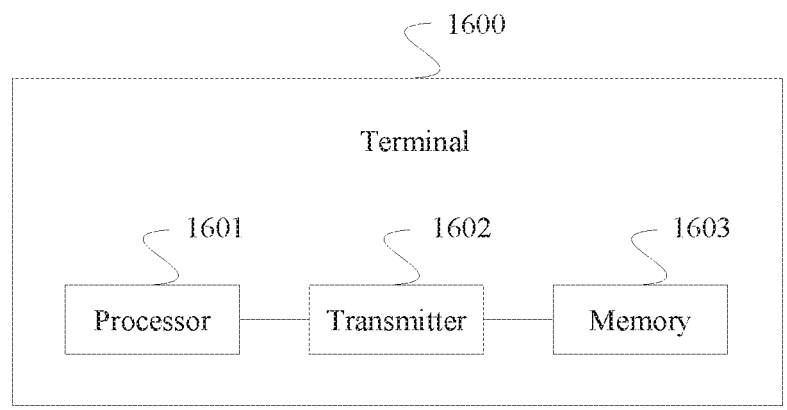
FIG. 16 is a schematic structural diagram of a terminal 1600 according to an embodiment of this application.

FIG. 16 is a schematic structural diagram of a terminal 1600 according to an embodiment of this application. As shown in FIG. 16, the terminal 1600 includes a processor 1601, a transmitter 1602, and a memory 1603. The memory 1603 is configured to store an execution instruction of the processor 1601, so that the processor 1601 implements the following function.

The processor 1601 is configured to detect downlink control information DCI in a plurality of time units corresponding to at least one carrier, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second DCI is used to indicate to feed back transport block TB-level HARQ-ACK information for data scheduled by using the second DCI.

The transmitter 1602 is configured to send a HARQ-ACK feedback codebook to a network device, where the HARQ-ACK feedback codebook includes HARQ-ACK information of at least one piece of data scheduled by using the DCI.

The HARQ-ACK feedback codebook is determined based on the type of the DCI and a type of the HARQ-ACK feedback codebook, and the type of the HARQ-ACK feedback codebook is a semi-persistent type or a dynamic type.

Optionally, if first data is scheduled based on the first DCI, the first M1 bits in N1 bits that are in the HARQ-ACK feedback codebook and that correspond to the first data are code block group CBG-level HARQ-ACK information of the first data, and the following (N1−M1) bits in the N1 bits are negative acknowledgments NACKs, where N1 is a maximum quantity of CBGs configured by the network device for the first data, and M1 is a quantity of CBGs actually included in the first data.

If second data is scheduled based on the second DCI, the first bit in N2 bits in the HARQ-ACK feedback codebook that correspond to the second data is TB-level HARQ-ACK information of the second data, and each of the following (N2−1) bits in the N2 bits is a NACK or TB-level HARQ-ACK information, where N2 is a maximum quantity of CBGs configured by the network device for the second data.

The first data is any data that is in the at least one piece of data and that is scheduled based on the first DCI, and the second data is any data that is in the at least one piece of data and that is scheduled based on the second DCI.

Optionally, all HARQ-ACK information included in the HARQ-ACK feedback codebook is CBG-level HARQ-ACK information.

Optionally, the processor 1601 is further configured to determine a size of the HARQ-ACK feedback codebook.

If the determined size of the HARQ-ACK feedback codebook is less than a preset threshold, the first bit in N2 bits in the HARQ-ACK feedback codebook that correspond to second data is TB-level HARQ-ACK information of the second data, and each of the following (N2−1) bits in the N2 bits is a NACK or TB-level HARQ-ACK information; or if the determined size of the HARQ-ACK feedback codebook is greater than or equal to a preset threshold, the first M2 bits in N2 bits that are in the HARQ-ACK feedback codebook and that correspond to second data are CBG-level HARQ-ACK information of the second data, and the following (N2−M2) bits in the N2 bits are negative acknowledgments NACKs, where N2 is a maximum quantity of CBGs configured by the network device for the second data, and M2 is a quantity of CBGs actually included in the second data.

The second data is any data that is in the at least one piece of data and that is scheduled based on the second DCI.

Optionally, if the type of the HARQ-ACK feedback codebook is the dynamic type, the HARQ-ACK feedback codebook includes a first sub-codebook and/or a second sub-codebook.

The first sub-codebook includes CBG-level HARQ-ACK information of data scheduled based on the first DCI, and the second sub-codebook includes TB-level HARQ-ACK information of data scheduled based on the second DCI.

Optionally, the first M1 bits in N1 bits that are in the first sub-codebook and that correspond to first data are CBG-level HARQ-ACK information of the first data, and the following (N1−M1) bits in the N1 bits are NACKs, where N1 is a maximum quantity of CBGs configured by the network device for the first data, and M1 is a quantity of CBGs actually included in the first data; and one bit, in the second sub-codebook, corresponding to second data is TB-level HARQ-ACK information of the second data.

The first data is any data that is in the at least one piece of data and that is scheduled based on the first DCI, and the second data is any data that is in the at least one piece of data and that is scheduled based on the second DCI.

Optionally, a size of the first sub-codebook is determined based on at least a downlink assignment index DAI value in the first DCI and N1; and a size of the second sub-codebook is determined based on at least a DAI value in the second DCI.

Optionally, if the type of the HARQ-ACK feedback codebook is the semi-persistent type, the size of the HARQ-ACK feedback codebook is determined based on at least a quantity of the at least one carrier, a quantity of the plurality of time units, and a maximum quantity of CBGs configured by the network device for each carrier.

Optionally, if the type of the HARQ-ACK feedback codebook is the dynamic type, the size of the HARQ-ACK feedback codebook is determined based on at least a downlink assignment index DAI value in the DCI and a maximum quantity of CBGs configured by the network device for each carrier.

The terminal provided in this application may perform the method for sending a HARQ-ACK feedback codebook performed by the foregoing terminal and an optional manner of the method. An implementation principle and technical effects thereof are similar to those of the method, and details are not described herein again.

Figure 17:
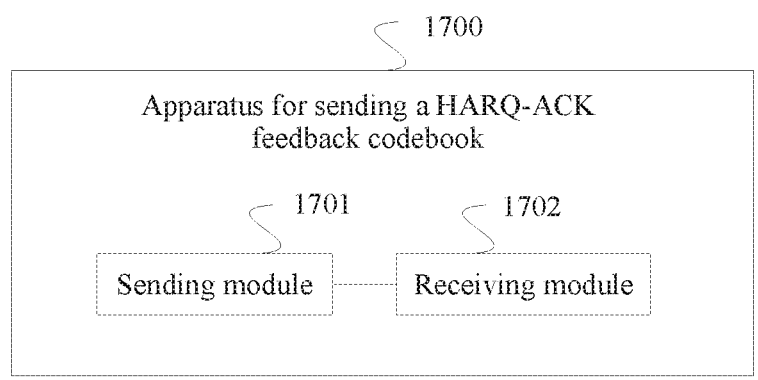
FIG. 17 is a schematic structural diagram of an apparatus 1700 for sending a HARQ-ACK feedback codebook according to an embodiment of this application.

FIG. 17 is a schematic structural diagram of an apparatus 1700 for sending a HARQ-ACK feedback codebook according to an embodiment of this application. As shown in FIG. 17, the apparatus 1700 includes:

a sending module 1701, configured to send downlink control information DCI in a plurality of time units corresponding to at least one carrier to a terminal, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second DCI is used to indicate to feed back transport block TB-level HARQ-ACK information for data scheduled by using the second DCI; and a receiving module 1702, configured to receive a HARQ-ACK feedback codebook sent by the terminal, where the HARQ-ACK feedback codebook includes HARQ-ACK information of at least one piece of data scheduled by using the DCI.

The HARQ-ACK feedback codebook is determined based on the type of the DCI and a type of the HARQ-ACK feedback codebook, and the type of the HARQ-ACK feedback codebook is a semi-persistent type or a dynamic type.

Optionally, if first data is scheduled based on the first DCI, the first M1 bits in N1 bits that are in the HARQ-ACK feedback codebook and that correspond to the first data are code block group CBG-level HARQ-ACK information of the first data, and the following (N1−M1) bits in the N1 bits are negative acknowledgments NACKs, where N1 is a maximum quantity of CBGs configured by the network device for the first data, and M1 is a quantity of CBGs actually included in the first data.

If second data is scheduled based on the second DCI, the first bit in N2 bits in the HARQ-ACK feedback codebook that correspond to the second data is TB-level HARQ-ACK information of the second data, and each of the following (N2−1) bits in the N2 bits is a NACK or TB-level HARQ-ACK information, where N2 is a maximum quantity of CBGs configured by the network device for the second data.

The first data is any data that is in the at least one piece of data and that is scheduled based on the first DCI, and the second data is any data that is in the at least one piece of data and that is scheduled based on the second DCI.

Optionally, all HARQ-ACK information included in the HARQ-ACK feedback codebook is CBG-level HARQ-ACK information.

Optionally, if the type of the HARQ-ACK feedback codebook is the dynamic type, the HARQ-ACK feedback codebook includes a first sub-codebook and/or a second sub-codebook.

The first sub-codebook includes CBG-level HARQ-ACK information of data scheduled based on the first DCI, and the second sub-codebook includes TB-level HARQ-ACK information of data scheduled based on the second DCI.

Optionally, the first M1 bits in N1 bits that are in the first sub-codebook and that correspond to first data are CBG-level HARQ-ACK information of the first data, and the following (N1−M1) bits in the N1 bits are NACKs, where N1 is a maximum quantity of CBGs configured by the network device for the first data, and M1 is a quantity of CBGs actually included in the first data; and one bit, in the second sub-codebook, corresponding to second data is TB-level HARQ-ACK information of the second data. The first data is any data that is in the at least one piece of data and that is scheduled based on the first DCI, and the second data is any data that is in the at least one piece of data and that is scheduled based on the second DCI.

Optionally, a size of the first sub-codebook is determined based on at least a downlink assignment index DAI value in the first DCI and N1; and a size of the second sub-codebook is determined based on at least a DAI value in the second DCI.

Optionally, if the type of the HARQ-ACK feedback codebook is the semi-persistent type, the size of the HARQ-ACK feedback codebook is determined based on at least a quantity of the at least one carrier, a quantity of the plurality of time units, and a maximum quantity of CBGs configured by the network device for each carrier.

Optionally, if the type of the HARQ-ACK feedback codebook is the dynamic type, the size of the HARQ-ACK feedback codebook is determined based on at least a downlink assignment index DAI value in the DCI and a maximum quantity of CBGs configured by the network device for each carrier.

The apparatus for sending a HARQ-ACK feedback codebook provided in this application may perform the method for sending a HARQ-ACK feedback codebook performed by the foregoing network device and an optional manner of the method. An implementation principle and technical effects thereof are similar to those of the method, and details are not described herein again.

Figure 18:
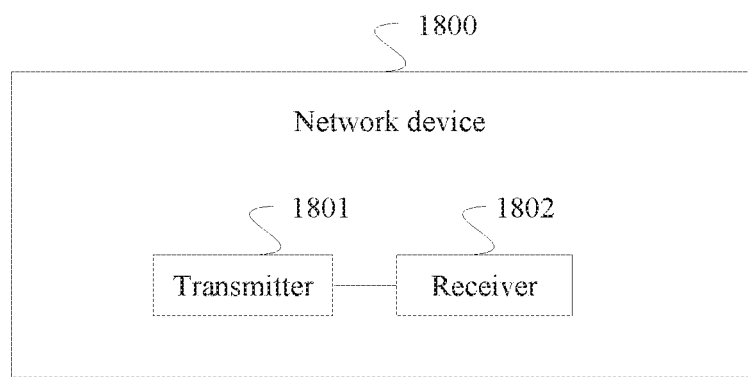
FIG. 18 is a schematic structural diagram of a network device 1800 according to an embodiment of this application.

FIG. 18 is a schematic structural diagram of a network device 1800 according to an embodiment of this application. As shown in FIG. 18, the network device 1800 includes:

a transmitter 1801, configured to send downlink control information DCI in a plurality of time units corresponding to at least one carrier to a terminal, where a type of the DCI is a first DCI type or a second DCI type, the first DCI is used to indicate to feed back code block group CBG-level hybrid automatic repeat request-acknowledgment HARQ-ACK information for data scheduled by using the first DCI, and the second DCI is used to indicate to feed back transport block TB-level HARQ-ACK information for data scheduled by using the second DCI; and a receiver 1802, configured to receive a HARQ-ACK feedback codebook sent by the terminal, where the HARQ-ACK feedback codebook includes HARQ-ACK information of at least one piece of data scheduled by using the DCI.

The HARQ-ACK feedback codebook is determined based on the type of the DCI and a type of the HARQ-ACK feedback codebook, and the type of the HARQ-ACK feedback codebook is a semi-persistent type or a dynamic type.

Optionally, if first data is scheduled based on the first DCI, the first M1 bits in N1 bits that are in the HARQ-ACK feedback codebook and that correspond to the first data are code block group CBG-level HARQ-ACK information of the first data, and the following (N1−M1) bits in the N1 bits are negative acknowledgments NACKs, where N1 is a maximum quantity of CBGs configured by the network device for the first data, and M1 is a quantity of CBGs actually included in the first data.

If second data is scheduled based on the second DCI, the first bit in N2 bits in the HARQ-ACK feedback codebook that correspond to the second data is TB-level HARQ-ACK information of the second data, and each of the following (N2−1) bits in the N2 bits is a NACK or TB-level HARQ-ACK information, where N2 is a maximum quantity of CBGs configured by the network device for the second data.

The first data is any data that is in the at least one piece of data and that is scheduled based on the first DCI, and the second data is any data that is in the at least one piece of data and that is scheduled based on the second DCI.

Optionally, all HARQ-ACK information included in the HARQ-ACK feedback codebook is CBG-level HARQ-ACK information.

Optionally, if the type of the HARQ-ACK feedback codebook is the dynamic type, the HARQ-ACK feedback codebook includes a first sub-codebook and/or a second sub-codebook.

The first sub-codebook includes CBG-level HARQ-ACK information of data scheduled based on the first DCI, and the second sub-codebook includes TB-level HARQ-ACK information of data scheduled based on the second DCI.

Optionally, the first M1 bits in N1 bits that are in the first sub-codebook and that correspond to first data are CBG-level HARQ-ACK information of the first data, and the following (N1−M1) bits in the N1 bits are NACKs, where N1 is a maximum quantity of CBGs configured by the network device for the first data, and M1 is a quantity of CBGs actually included in the first data; and one bit, in the second sub-codebook, corresponding to second data is TB-level HARQ-ACK information of the second data. The first data is any data that is in the at least one piece of data and that is scheduled based on the first DCI, and the second data is any data that is in the at least one piece of data and that is scheduled based on the second DCI.

Optionally, a size of the first sub-codebook is determined based on at least a downlink assignment index DAI value in the first DCI and N1; and a size of the second sub-codebook is determined based on at least a DAI value in the second DCI.

Optionally, if the type of the HARQ-ACK feedback codebook is the semi-persistent type, the size of the HARQ-ACK feedback codebook is determined based on at least a quantity of the at least one carrier, a quantity of the plurality of time units, and a maximum quantity of CBGs configured by the network device for each carrier.

Optionally, if the type of the HARQ-ACK feedback codebook is the dynamic type, the size of the HARQ-ACK feedback codebook is determined based on at least a downlink assignment index DAI value in the DCI and a maximum quantity of CBGs configured by the network device for each carrier.

The network device provided in this application may perform the method for sending a HARQ-ACK feedback codebook performed by the foregoing network device and an optional manner of the method. An implementation principle and technical effects thereof are similar to those of the method, and details are not described herein again.

What is claimed is:

1. A method for sending a hybrid automatic repeat request-acknowledgment (HARQ-ACK) feedback codebook, comprising:
   detecting, by a terminal, downlink control information (DCI) in a plurality of time units corresponding to at least one carrier, wherein a type of the DCI is a first DCI type or a second DCI type, wherein the first DCI type is used to indicate to feed back code block group (CBG)-level HARQ-ACK information for data scheduled by using the first DCI type, and wherein the second DCI type is used to indicate to feed back transport block (TB)-level HARQ-ACK information for data scheduled by using the second DCI type;
   determining, by the terminal, a size of a HARQ-ACK feedback codebook, wherein N is a maximum quantity of CBGs configured by a network device for particular data, wherein M is a quantity of CBGs actually comprised in the particular data, and wherein:
   if the determined size of the HARQ-ACK feedback codebook is less than a preset threshold, a first bit in N bits in the HARQ-ACK feedback codebook that correspond to the particular data is TB-level HARQ-ACK information of the particular data; or
if the determined size of the HARQ-ACK feedback codebook is greater than or equal to a preset threshold, first M bits in N bits that are in the HARQ-ACK feedback codebook and that correspond to the particular data are CBG-level HARQ-ACK information of the particular data; and
sending, by the terminal, the HARQ-ACK feedback codebook to the network device, wherein the HARQ-ACK feedback codebook comprises HARQ-ACK information of at least one piece of data scheduled by using the DCI, wherein the HARQ-ACK feedback codebook is determined according to the type of the DCI and a type of the HARQ-ACK feedback codebook, and wherein the type of the HARQ-ACK feedback codebook is a semi-persistent type or a dynamic type.

2. The method according to claim 1, wherein if first data is scheduled according to the first DCI type, first M1 bits in N1 bits that are in the HARQ-ACK feedback codebook and that correspond to the first data are code block group (CBG)-level HARQ-ACK information of the first data, and wherein the following (N1−M1) bits in the N1 bits are negative acknowledgments (NACKs), wherein N1 is a maximum quantity of CBGs configured by the network device for the first data, and wherein M1 is a quantity of CBGs actually comprised in the first data; and
if second data is scheduled according to the second DCI type, the first bit in N2 bits in the HARQ-ACK feedback codebook that correspond to the second data is TB-level HARQ-ACK information of the second data, and wherein each of the following (N2−1) bits in the N2 bits is a NACK or TB-level HARQ-ACK information, wherein N2 is a maximum quantity of CBGs configured by the network device for the second data, and
wherein the first data is any data that is in the at least one piece of data and that is scheduled according to the first DCI type, and wherein the second data is any data that is in the at least one piece of data and that is scheduled according to the second DCI type.

3. The method according to claim 1, wherein all HARQ-ACK information comprised in the HARQ-ACK feedback codebook is CBG-level HARQ-ACK information.

4. The method according to claim 1, wherein:
if the determined size of the HARQ-ACK feedback codebook is less than the preset threshold, each of (N−1) bits following the first bit in the N bits is a negative acknowledgments (NACK) or TB-level HARQ-ACK information; or
if the determined size of the HARQ-ACK feedback codebook is greater than or equal to the preset threshold, (N−M) bits following the first M bits in the N bits are NACKs,
wherein the particular data is comprised in the at least one piece of data and is scheduled according to the second DCI type.

5. The method according to claim 1, wherein if the type of the HARQ-ACK feedback codebook is the dynamic type, the HARQ-ACK feedback codebook comprises at least one of a first sub-codebook or a second sub-codebook, wherein the first sub-codebook comprises CBG-level HARQ-ACK information of data scheduled according to the first DCI type, and the second sub-codebook comprises TB-level HARQ-ACK information of data scheduled according to the second DCI type.

6. The method according to claim 5, wherein:
first M1 bits in N1 bits that are in the first sub-codebook and that correspond to first data are CBG-level HARQ-ACK information of the first data, and wherein the following (N1−M1) bits in the N1 bits are NACKs, wherein N1 is a maximum quantity of CBGs configured by the network device for the first data, and wherein M1 is a quantity of CBGs actually comprised in the first data; and
one bit, in the second sub-codebook, corresponding to second data is TB-level HARQ-ACK information of the second data, and
wherein the first data is any data that is in the at least one piece of data and that is scheduled according to the first DCI type, and the second data is any data that is in the at least one piece of data and that is scheduled according to the second DCI type.

7. A terminal, comprising:
at least one processor;
a transmitter; and
one or more memories coupled to the at least one processor and storing programming instructions for execution by the at least one processor to:
detect downlink control information (DCI) in a plurality of time units corresponding to at least one carrier, wherein a type of the DCI is a first DCI type or a second DCI type, wherein the first DCI type is used to indicate to feed back code block group (CBG)-level hybrid automatic repeat request-acknowledgment (HARQ-ACK) information for data scheduled by using the first DCI type, and wherein the second DCI type is used to indicate to feed back transport block (TB)-level HARQ-ACK information for data scheduled by using the second DCI type;
determine a size of a HARQ-ACK feedback codebook, wherein N is a maximum quantity of CBGs configured by a network device for particular data, wherein M is a quantity of CBGs actually comprised in the particular data, and wherein:
if the determined size of the HARQ-ACK feedback codebook is less than a preset threshold, a first bit in N bits in the HARQ-ACK feedback codebook that correspond to the particular data is TB-level HARQ-ACK information of the particular data; or
if the determined size of the HARQ-ACK feedback codebook is greater than or equal to a preset threshold, first M bits in N bits that are in the HARQ-ACK feedback codebook and that correspond to the particular data are CBG-level HARQ-ACK information of the particular data; and
send, by the transmitter, the HARQ-ACK feedback codebook to the network device, wherein the HARQ-ACK feedback codebook comprises HARQ-ACK information of at least one piece of data scheduled by using the DCI, wherein the HARQ-ACK feedback codebook is determined according to the type of the DCI and a type of the HARQ-ACK feedback codebook, and wherein the type of the HARQ-ACK feedback codebook is a semi-persistent type or a dynamic type.

8. The terminal according to claim 7, wherein:
if first data is scheduled according to the first DCI type, first M1 bits in N1 bits that are in the HARQ-ACK feedback codebook and that correspond to the first data are code block group (CBG)-level HARQ-ACK information of the first data, and wherein the following (N1−M1) bits in the N1 bits are negative acknowledgments (NACKs), wherein N1 is a maximum quantity of CBGs configured by the network device for the first data, and wherein M1 is a quantity of CBGs actually comprised in the first data; and if second data is scheduled according to the second DCI type, the first bit in N2 bits in the HARQ-ACK feedback codebook that correspond to the second data is TB-level HARQ-ACK information of the second data, and each of the following (N2−1) bits in the N2 bits is a NACK or TB-level HARQ-ACK information, wherein N2 is a maximum quantity of CBGs configured by the network device for the second data, and wherein the first data is any data that is in the at least one piece of data and that is scheduled according to the first DCI type, and the second data is any data that is in the at least one piece of data and that is scheduled according to the second DCI type.

9. The terminal according to claim 7, wherein all HARQ-ACK information comprised in the HARQ-ACK feedback codebook is CBG-level HARQ-ACK information.

10. The terminal according to claim 9, wherein:
if the determined size of the HARQ-ACK feedback codebook is less than the preset threshold, each of (N−1) bits following the first bit in the N bits is a negative acknowledgments (NACK) or TB-level HARQ-ACK information; or
if the determined size of the HARQ-ACK feedback codebook is greater than or equal to the preset threshold, (N−M) bits following the first M bits in the N bits are NACKs,
wherein the particular data is comprised in the at least one piece of data and is scheduled according to the second DCI type.

11. The terminal according to claim 9, wherein if the type of the HARQ-ACK feedback codebook is the dynamic type, the HARQ-ACK feedback codebook comprises at least one of a first sub-codebook or a second sub-codebook, wherein the first sub-codebook comprises CBG-level HARQ-ACK information of data scheduled according to the first DCI type, and wherein the second sub-codebook comprises TB-level HARQ-ACK information of data scheduled according to the second DCI type.

12. The terminal according to claim 11, wherein:
first M1 bits in N1 bits that are in the first sub-codebook and that correspond to first data are CBG-level HARQ-ACK information of the first data, and wherein the following (N1−M1) bits in the N1 bits are NACKs, wherein N1 is a maximum quantity of CBGs configured by the network device for the first data, and wherein M1 is a quantity of CBGs actually comprised in the first data; and
one bit, in the second sub-codebook, corresponding to second data is TB-level HARQ-ACK information of the second data, and
wherein the first data is any data that is in the at least one piece of data and that is scheduled according to the first DCI type, and the second data is any data that is in the at least one piece of data and that is scheduled according to the second DCI type.

13. A network device, comprising:
a transmitter;
a receiver;
at least one processor; and
one or more memories coupled to the at least one processor and storing programming instructions for execution by the at least one processor to:
send, by the transmitter, downlink control information (DCI) in a plurality of time units corresponding to at least one carrier to a terminal, wherein a type of the DCI is a first DCI type or a second DCI type, wherein the first DCI type is used to indicate to feed back code block group (CBG)-level hybrid automatic repeat request-acknowledgment (HARQ-ACK) information for data scheduled by using the first DCI type, and wherein the second DCI type is used to indicate to feed back transport block (TB)-level HARQ-ACK information for data scheduled by using the second DCI type, wherein:
a size of a HARQ-ACK feedback codebook is determined, wherein N is a maximum quantity of CBGs configured by a network device for particular data, wherein M is a quantity of CBGs actually comprised in the particular data; and
if the determined size of the HARQ-ACK feedback codebook is less than a preset threshold, a first bit in N bits in the HARQ-ACK feedback codebook that correspond to the particular data is TB-level HARQ-ACK information of the particular data; or
if the determined size of the HARQ-ACK feedback codebook is greater than or equal to a preset threshold, first M bits in N bits that are in the HARQ-ACK feedback codebook and that correspond to the particular data are CBG-level HARQ-ACK information of the particular data; and
receive, by the receiver, a HARQ-ACK feedback codebook sent by the terminal, wherein the HARQ-ACK feedback codebook comprises HARQ-ACK information of at least one piece of data scheduled by using the DCI, wherein the HARQ-ACK feedback codebook is determined according to the type of the DCI and a type of the HARQ-ACK feedback codebook, and wherein the type of the HARQ-ACK feedback codebook is a semi-persistent type or a dynamic type.

14. The network device according to claim 13, wherein:
if first data is scheduled according to the first DCI type, first M1 bits in N1 bits that are in the HARQ-ACK feedback codebook and that correspond to the first data are code block group (CBG)-level HARQ-ACK information of the first data, and wherein the following (N1−M1) bits in the N1 bits are negative acknowledgments (NACKs), wherein N1 is a maximum quantity of CBGs configured by the network device for the first data, and wherein M1 is a quantity of CBGs actually comprised in the first data; and
if second data is scheduled according to the second DCI type, the first bit in N2 bits in the HARQ-ACK feedback codebook that correspond to the second data is TB-level HARQ-ACK information of the second data, and wherein each of the following (N2−1) bits in the N2 bits is a NACK or TB-level HARQ-ACK information, wherein N2 is a maximum quantity of CBGs configured by the network device for the second data, and
wherein the first data is any data that is in the at least one piece of data and that is scheduled according to the first DCI type, and the second data is any data that is in the at least one piece of data and that is scheduled according to the second DCI type.

15. The network device according to claim 13, wherein all HARQ-ACK information comprised in the HARQ-ACK feedback codebook is CBG-level HARQ-ACK information.

16. The network device according to claim 13, wherein if the type of the HARQ-ACK feedback codebook is the dynamic type, the HARQ-ACK feedback codebook comprises at least one of a first sub-codebook or a second sub-codebook, wherein the first sub-codebook comprises CBG-level HARQ-ACK information of data scheduled according to the first DCI type, and wherein the second sub-codebook comprises TB-level HARQ-ACK information of data scheduled according to the second DCI type.

17. The network device according to claim 16, wherein:
first M1 bits in N1 bits that are in the first sub-codebook and that correspond to first data are CBG-level HARQ-ACK information of the first data, and wherein the following (N1−M1) bits in the N1 bits are NACKs, wherein N1 is a maximum quantity of CBGs configured by the network device for the first data, and wherein M1 is a quantity of CBGs actually comprised in the first data; and
one bit, in the second sub-codebook, corresponding to second data is TB-level HARQ-ACK information of the second data, and
wherein the first data is any data that is in the at least one piece of data and that is scheduled according to the first DCI type, and the second data is any data that is in the at least one piece of data and that is scheduled according to the second DCI type.

18. The network device according to claim 17, wherein:
a size of the first sub-codebook is determined according to at least a downlink assignment index (DAI) value in the first DCI type and N1; and
a size of the second sub-codebook is determined according to at least a DAI value in the second DCI type.

19. The network device according to claim 13, wherein, if the type of the HARQ-ACK feedback codebook is the semi-persistent type, the size of the HARQ-ACK feedback codebook is determined according to at least a quantity of the at least one carrier, a quantity of the plurality of time units, and a maximum quantity of CBGs configured by the network device for each carrier.

20. The network device according to claim 13, wherein, if the type of the HARQ-ACK feedback codebook is the dynamic type, the size of the HARQ-ACK feedback codebook is determined according to at least a downlink assignment index (DAI) value in the DCI and a maximum quantity of CBGs configured by the network device for each carrier.

* * * * *